(12) United States Patent
Yonezawa et al.

(10) Patent No.: US 11,021,154 B2
(45) Date of Patent: Jun. 1, 2021

(54) HYBRID VEHICLE AND METHOD OF BRAKING HYBRID VEHICLE

(71) Applicant: TOYOTA JIDOSHA KABUSHIKI KAISHA, Toyota (JP)

(72) Inventors: Koichi Yonezawa, Toyota (JP); Satoshi Yoshizaki, Gotenba (JP); Osamu Maeda, Toyota (JP); Daigo Ando, Nagoya (JP); Yoshikazu Asami, Gotenba (JP); Kenji Itagaki, Shizuoka-ken (JP); Shunsuke Oyama, Nagakute (JP); Koichiro Muta, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/798,700

(22) Filed: Feb. 24, 2020

(65) Prior Publication Data

US 2020/0298857 A1    Sep. 24, 2020

(30) Foreign Application Priority Data

Mar. 22, 2019  (JP) .............................. JP2019-054657

(51) Int. Cl.
*B60W 30/18*    (2012.01)
*B60K 6/365*    (2007.10)
(Continued)

(52) U.S. Cl.
CPC ......... *B60W 30/18127* (2013.01); *B60K 6/24* (2013.01); *B60K 6/28* (2013.01);
(Continued)

(58) Field of Classification Search
CPC ...... B60W 10/06; B60W 10/08; B60W 10/26; B60W 10/30; B60W 10/18; B60W 10/184;
(Continued)

(56) References Cited

U.S. PATENT DOCUMENTS

| 2005/0001480 A1* | 1/2005 | Tabata | F02D 11/105 303/141 |
| 2011/0144876 A1* | 6/2011 | Miah | F02D 41/021 701/70 |

(Continued)

FOREIGN PATENT DOCUMENTS

JP    2015-058924 A    3/2015

*Primary Examiner* — Edwin A Young
(74) *Attorney, Agent, or Firm* — Sughrue Mion, PLLC

(57) ABSTRACT

In a hybrid vehicle, each of an engine and an MG1 is mechanically coupled to a drive wheel with a planetary gear being interposed. The planetary gear and an MG2 are configured such that motive power output from the planetary gear and motive power output from the MG2 are transmitted to the drive wheel as being combined. When a first condition is satisfied during traveling of the vehicle, a controller stops combustion in the engine and performs motoring by the MG1 such that the planetary gear outputs deceleration torque. When a second condition in addition to the first condition is satisfied (YES in S20) during deceleration of the hybrid vehicle with deceleration torque, the controller performs motoring with throttle opening being set to first opening or larger and WGV opening being set to second opening or smaller.

9 Claims, 10 Drawing Sheets

(51) Int. Cl.
    *B60W 10/08*     (2006.01)
    *B60W 10/196*     (2012.01)
    *B60K 6/28*     (2007.10)
    *B60L 7/26*     (2006.01)
    *B60W 10/06*     (2006.01)
    *B60W 10/184*     (2012.01)
    *B60W 10/26*     (2006.01)
    *B60W 20/00*     (2016.01)
    *B60K 6/24*     (2007.10)

(52) U.S. Cl.
    CPC ............... *B60K 6/365* (2013.01); *B60L 7/26* (2013.01); *B60W 10/06* (2013.01); *B60W 10/08* (2013.01); *B60W 10/184* (2013.01); *B60W 10/196* (2013.01); *B60W 10/26* (2013.01); *B60W 20/00* (2013.01); *B60W 30/18136* (2013.01); *B60W 2510/0638* (2013.01); *B60W 2510/244* (2013.01); *B60W 2540/10* (2013.01); *B60W 2540/12* (2013.01); *B60W 2710/06* (2013.01); *B60W 2710/08* (2013.01); *B60W 2710/18* (2013.01); *B60Y 2200/92* (2013.01)

(58) Field of Classification Search
    CPC ......... B60W 10/196; B60W 30/18127; B60W 30/18136; B60W 20/00; B60W 20/40; B60W 2510/0638; B60W 2510/244; B60W 2540/10; B60W 2540/12; B60W 2710/06; B60W 2710/08; B60W 2710/18; B60W 2710/0638; B60K 6/28; B60K 6/365; B60L 7/26
    See application file for complete search history.

(56) References Cited

U.S. PATENT DOCUMENTS

| | | | |
|---|---|---|---|
| 2015/0285161 A1* | 10/2015 | Ulrey | B60W 20/16 477/3 |
| 2015/0361905 A1* | 12/2015 | Lofgren | B60L 58/12 417/34 |
| 2018/0304895 A1* | 10/2018 | Okubo | B60W 30/18109 |

* cited by examiner

《LOW-SPEED TRAVELING》

<<HIGH-SPEED TRAVELING>>

<<ENGINE BRAKE CONTROL DURING LOW-SPEED TRAVELING>>

<<ENGINE BRAKE CONTROL DURING HIGH-SPEED TRAVELING>>

<<BRAKING-FORCE-REINFORCED ENGINE BRAKE CONTROL>>

<<ENGINE BRAKE + BRAKE APPARATUS>>

HYBRID VEHICLE AND METHOD OF BRAKING HYBRID VEHICLE

This nonprovisional application is based on Japanese Patent Application No. 2019-054657 filed with the Japan Patent Office on Mar. 22, 2019, the entire contents of which are hereby incorporated by reference.

BACKGROUND

Field

The present disclosure relates to a hybrid vehicle and a method of braking a hybrid vehicle.

Description of the Background Art

Japanese Patent Laying-Open No. 2015-58924 discloses a hybrid vehicle including an engine with a turbocharger and a motor generator.

SUMMARY

A hybrid vehicle is mainly braked by regenerative braking applied by a motor generator, engine brake applied by an engine, and a brake apparatus.

Regenerative braking refers to electric braking applied by converting kinetic energy of a vehicle into electric energy by controlling a motor generator to function as a generator. Electric power generated by regenerative braking can be stored in a power storage mounted on the vehicle. Regenerative braking, on the other hand, is restricted by a state of charge (SOC) of the power storage. For example, when the power storage is fully charged, electric power generated by regenerative braking can no longer be input to the power storage. In such a situation that electric power generated by regenerative braking cannot be stored nor consumed, regenerative braking cannot be effected.

Engine brake refers to brakes making use of resistance of the engine. For example, as engine output is throttled down from a state of equilibrium between engine output and traveling resistance during traveling of the vehicle, braking force is applied to the vehicle by engine brake. By way of example of engine brake control, it has been known that braking force by engine brake is reinforced by cutting off fuel to the engine during deceleration of the vehicle.

A hydraulic foot brake activated by pressing of a brake pedal by a driver has been known as a brake apparatus. The brake apparatus applies brakes by converting kinetic energy into thermal energy. The driver can selectively use engine brake and the brake apparatus by operating an accelerator pedal and a brake pedal.

In recent years, however, a turbocharged downsizing engine has attracted attention as a technique for improving a fuel consumption rate of the vehicle, and reduction in size of the engine has been promoted. The turbocharged downsizing engine refers to an engine under a concept of compensation for insufficiency in power by forced induction by a turbocharger while consumption of fuel is suppressed by downsizing (for example, reduction in amount of exhaust and in number of cylinders). In such a turbocharged downsizing engine, loss in the engine is lessened by downsizing and braking force by engine brake is weakened. Therefore, even though fuel to the engine is cut off during deceleration of the vehicle, sufficient braking force by engine brake may not be obtained.

The present disclosure was made to solve the problem above, and an object thereof is to provide a hybrid vehicle that readily ensures sufficient braking force by engine brake during deceleration of the vehicle and a method of braking a hybrid vehicle.

A hybrid vehicle according to the present disclosure includes a drive wheel, an engine, a first motor generator (which is also referred to as an "MG1" below), a second motor generator (which is also referred to as an "MG2" below), and a controller. Each of the engine, the MG1, and the MG2 is mechanically coupled to the drive wheel. The controller controls the engine, the MG1, and the MG2. The engine includes an engine main body where combustion is performed, an intake air passage and an exhaust passage connected to the engine main body, a turbocharger, a throttle valve provided in the intake air passage, a bypass passage connected to the exhaust passage, and a waste gate valve (which is also referred to as a "WGV" below) provided in the bypass passage. The turbocharger includes a compressor provided in the intake air passage and a turbine provided in the exhaust passage. The compressor and the turbine are rotated together. The bypass passage allows exhaust to flow as bypassing the turbine. Each of the engine and the MG1 is mechanically coupled to the drive wheel with a planetary gear being interposed. The planetary gear and the MG2 are configured such that motive power output from the planetary gear and motive power output from the MG2 are transmitted to the drive wheel as being combined. When a first condition is satisfied during traveling of the hybrid vehicle, the controller stops combustion in the engine and performs motoring by the MG1 such that the planetary gear outputs deceleration torque. When a second condition in addition to the first condition is satisfied during deceleration of the hybrid vehicle with deceleration torque, the controller performs the motoring with opening of the throttle valve (which is also referred to as "throttle opening" below) being set to first opening or larger and opening of the waste gate valve (which is also referred to as "WGV opening" below) being set to second opening or smaller.

In the hybrid vehicle, the engine, the MG1, the MG2, and the planetary gear are in the relation above. Since the MG1 and the engine are coupled to each other with the planetary gear being interposed, the MG1 can perform motoring of the engine. Since the MG2 is mechanically coupled to the drive wheel, the MG2 can apply regenerative braking. When the first condition is satisfied during traveling of the vehicle, the controller stops combustion in the engine and performs motoring by the MG1 such that the planetary gear outputs deceleration torque. As the MG1 performs motoring, deceleration torque resulting from stop of combustion in the engine (that is, braking force applied by engine brake) can be transmitted to the drive wheel.

Furthermore, when the second condition in addition to the first condition is satisfied, the controller of the hybrid vehicle performs the previously-described motoring by setting throttle opening to first opening or larger and setting WGV opening to second opening or smaller (which is also referred to as a "turbocharged valve state" below). With the throttle opening being large and the WGV opening being small, forced induction by the turbocharger is performed and charging efficiency (that is, suction efficiency) of the engine and a back pressure of the engine (that is, a pressure on an exhaust side) both become higher. In the engine, as charging efficiency is higher, compression work tends to be greater, and as the back pressure is higher, exhaust loss tends to be larger. Therefore, when both of the first condition and the second condition are satisfied during deceleration of the vehicle and when the previously-described motoring is performed in the turbocharged valve state, resistance of the engine becomes higher and braking force applied by engine brake becomes stronger. Thus, in the hybrid vehicle, sufficient braking force is readily ensured by engine brake during deceleration of the vehicle.

Determination as to whether or not the first condition is satisfied is also referred to as "first determination" below and determination as to whether or not the second condition is satisfied is also referred to as "second determination" below. The controller may make first determination and second determination separately or simultaneously (that is, as one determination).

The controller may make second determination only when motoring is started (including immediately before and after start), only during motoring, or both of (1) when motoring is started and (2) during motoring. The controller may repeatedly make second determination during motoring.

The second condition may be satisfied whenever the first condition is satisfied or only when a prescribed requirement is satisfied. For example, the second condition may include a condition that a rotation speed of the engine is equal to or higher than a first speed (which is also referred to as a "Ne requirement" below). In other words, the second condition may be satisfied only when the rotation speed of the engine is equal to or higher than a prescribed speed.

When combustion in the engine is resumed after the controller stops combustion in the engine as described previously as the first condition is satisfied during traveling of the vehicle, in order to suppress abnormal combustion, combustion of the engine is desirably resumed in a natural aspiration state (which is also referred to as an "NA state" below) in which forced induction is not performed. When the second condition in addition to the first condition is satisfied and the throttle valve and the WGV are in the turbocharged valve state, however, the engine is in a forced induction state. When the rotation speed of the engine is low at the time of subsequent resumption of combustion in the engine, it takes time for the engine to return from the forced induction state to the NA state and a lag (which is also referred to as a "return lag" below) occurs. In this connection, according to the configuration, the second condition includes the Ne requirement. Therefore, the engine rotation speed at the time when the second condition is satisfied is high and a time period for the engine to return from the forced induction state to the NA state is shorter. A return lag at the time of resumption of combustion is thus suppressed.

The second condition may be satisfied whenever the Ne requirement is satisfied, or the second condition may not be satisfied simply when the Ne requirement is satisfied but the second condition may be satisfied when another requirement in addition to the Ne requirement is satisfied. For example, the second condition may include a condition that an SOC of the power storage that receives electric power generated by regenerative braking applied by the MG2 is equal to or higher than a prescribed SOC value, in addition to or instead of the Ne requirement. In other words, when the SOC of the power storage is high and large braking force is not obtained by regenerative braking, the controller may make braking force applied by engine brake larger by setting the throttle valve and the WGV to the turbocharged valve state. The SOC is defined as a ratio (for example, a percentage) of a current charge amount to a full charge amount. The prescribed SOC value may be set to 100%.

The hybrid vehicle may further include an accelerator sensor that detects an acceleration request from a driver. The first condition may include a condition that the rotation speed of the engine is equal to or higher than a second speed and a condition that the acceleration request from the driver is changed from ON to OFF (that is, the accelerator has been turned off). The second condition may include the Ne requirement and the second speed may be lower than the first speed defined in the Ne requirement. According to such a configuration, the first condition is not satisfied when the engine rotation speed is lower than the second speed. Therefore, when the engine rotation speed is low, engine stall can be suppressed without stopping combustion in the engine. The controller may set the engine to an idle state when the accelerator is turned off while the engine rotation speed is lower than the second speed. The hybrid vehicle may further include a brake sensor that detects a braking request from a driver. The first condition may include a condition that the rotation speed of the engine is equal to or higher than a third speed and a condition that the braking request from the driver is changed from OFF to ON (that is, the brake has been turned on). The second condition may include the Ne requirement and the third speed may be lower than the first speed defined in the Ne requirement. Turn-on of the brake instead of turn-off the accelerator described above may thus be set as a requirement for satisfying the first condition.

The hybrid vehicle may further include an electronically controllable brake apparatus that applies braking force to the drive wheel. The controller may not activate the electronically controllable brake apparatus simply in response to turn-on of the brake but may activate the electronically controllable brake apparatus when an amount of braking requested by the driver exceeds a prescribed amount.

In the turbocharged valve state, the throttle valve may fully be opened and the WGV may fully be closed. In other words, a fully opened state may be defined as first opening and a fully closed state may be defined as second opening. According to such a configuration, when the second condition in addition to the first condition is satisfied, large braking force applied by engine brake is readily obtained.

The hybrid vehicle may include a power storage capable of input and output of electric power to and from each of the MG1 and the MG2. According to such a configuration, electric power generated by each of the MG1 and the MG2 can be input to the power storage. The MG1 and the MG2 may supply and receive electric power to and from each other. According to such a configuration, the controller controls the MG2 to apply regenerative braking so that electric power generated by regenerative braking can be supplied to the MG1 and consumed in motoring by the MG1. As electric power generated by regenerative braking is consumed, electric power input to the power storage is reduced and hence overcharging of the power storage is suppressed.

When the first condition is satisfied and the second condition is not satisfied during traveling of the hybrid vehicle, the controller may stop combustion in the engine and control the MG1 to perform motoring while the controller controls the throttle valve and the WGV to maintain the engine main body in a combustion resumable state. According to such a configuration, when the second condition is not satisfied during deceleration of the vehicle, a return lag at the time of resumption of combustion can be suppressed by maintaining the engine main body in the combustion resumable state (for example, at minimum charging efficiency at which combustion can be performed). In control for maintaining the engine main body in the combustion resumable state, the WGV may be maintained in a fully opened state.

The hybrid vehicle may include the electronically controllable brake apparatus. When the first condition is satisfied and the second condition is not satisfied during traveling of the hybrid vehicle, the controller may make braking force applied by the electronically controllable brake apparatus larger than when the second condition is satisfied. When both of the first condition and the second condition are satisfied, such a controller of the hybrid vehicle reinforces braking force applied by engine brake by setting the throttle valve and the WGV to the turbocharged valve state, whereas when only the first condition is satisfied (that is, when the second condition is not satisfied), it makes braking force applied by the electronically controllable brake apparatus larger instead of setting the throttle valve and the WGV to the turbocharged valve state. By doing so, insufficiency in braking force applied by engine brake can be compensated for by the electronically controllable brake apparatus. According to the configuration, regardless of an operation of the brake by the driver, variation in braking force depending on whether or not the second condition is satisfied can be suppressed. Thus, the driver is less likely to feel discomfort during deceleration of the hybrid vehicle. Making braking force applied by the electronically controllable brake apparatus larger includes setting the electronically controllable brake apparatus from an off state to an on state.

A method of braking a hybrid vehicle according to the present disclosure is performed in a hybrid vehicle described below and it includes steps A to D described below.

A hybrid vehicle includes a drive wheel, an engine, an MG1, an MG2, and a controller. Each of the engine, the MG1, and the MG2 is mechanically coupled to the drive wheel. The controller controls the engine, the MG1, and the MG2. The engine includes an engine main body where combustion is performed, an intake air passage and an exhaust passage connected to the engine main body, a turbocharger, a throttle valve provided in the intake air passage, a bypass passage connected to the exhaust passage, and a WGV provided in the bypass passage. The turbocharger includes a compressor provided in the intake air passage and a turbine provided in the exhaust passage. The compressor and the turbine are rotated together. The bypass passage allows exhaust to flow as bypassing the turbine. Each of the engine and the MG1 is mechanically coupled to the drive wheel with a planetary gear being interposed. The planetary gear and the MG2 are configured such that motive power output from the planetary gear and motive power output from the MG2 are transmitted to the drive wheel as being combined.

In step A, the controller determines whether or not a first condition is satisfied during traveling of the hybrid vehicle.

In step B, when the controller determines that the first condition is satisfied, the controller stops combustion in the engine and performs motoring by the MG1 such that the planetary gear outputs deceleration torque.

In step C, the controller determines whether or not a second condition is satisfied at least one of (1) when motoring is started and (2) while motoring is being performed.

In step D, when the controller determines that the second condition is satisfied, the controller sets opening of the throttle valve to first opening or larger and sets opening of the waste gate valve to second opening or smaller.

According to the method, sufficient braking force is readily ensured by engine brake during deceleration of the hybrid vehicle.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
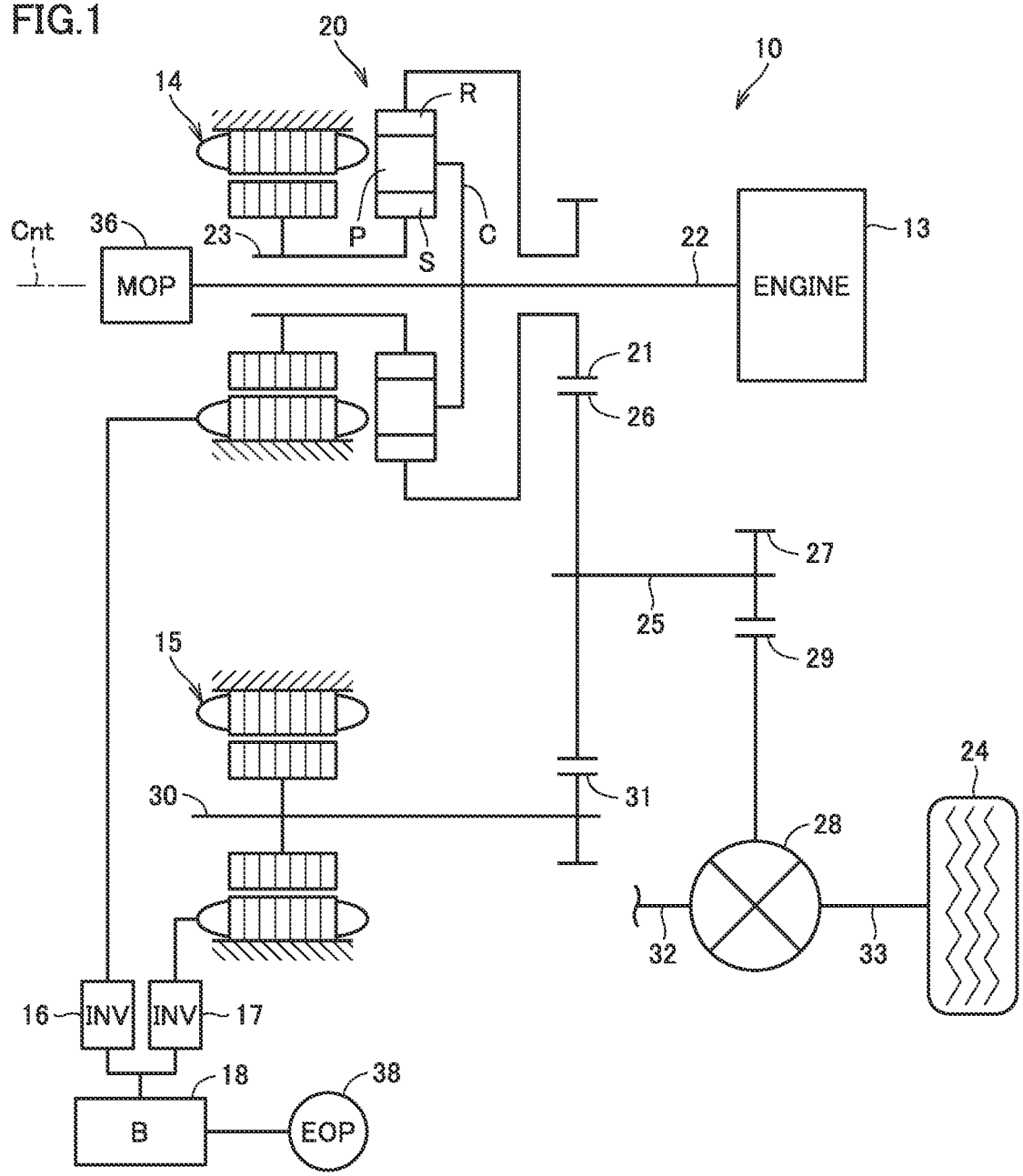
FIG. 1 is a diagram showing a drive device of a hybrid vehicle according to an embodiment of the present disclosure.

An embodiment of the present disclosure will be described in detail below with reference to the drawings. The same or corresponding elements in the drawings have the same reference characters allotted and description thereof will not be repeated. An electronic control unit is also referred to as an "ECU" below. A hybrid vehicle is also referred to as an "HV" and an electric vehicle is also referred to as an "EV".

FIG. 1 is a diagram showing a drive device of a hybrid vehicle according to this embodiment. Though a front-wheel drive four-wheel hybrid vehicle is assumed in the embodiment, the number of wheels and a drive scheme can be modified as appropriate.

Referring to FIG. 1, a drive device 10 of the hybrid vehicle (which is also simply referred to as a "vehicle" below) includes an engine 13 and motor generators (MGs) 14 and 15 as sources of motive power for traveling. Each of MGs 14 and 15 is a motor generator that performs both of a function as a motor that outputs torque by being supplied with driving electric power and a function as a generator that generates electric power by being supplied with torque. An alternating current (AC) motor (for example, a permanent magnet synchronous motor or an induction motor) is employed for each of MGs 14 and 15. MG 14 is electrically connected to a battery 18 with a first electric circuit being interposed. The first electric circuit includes a first inverter 16. MG 15 is electrically connected to battery 18 with a second electric circuit being interposed. The second electric circuit includes a second inverter 17. MGs 14 and 15 include rotor shafts 23 and 30, respectively. Rotor shafts 23 and 30 correspond to rotation shafts of MGs 14 and 15, respectively. MG 14 and MG 15 according to the embodiment correspond to an exemplary "first motor generator (MG1)" and an exemplary "second motor generator (MG2)" according to the present disclosure, respectively.

Battery 18 includes, for example, a secondary battery. For example, a lithium ion battery can be adopted as the secondary battery. Battery 18 may include a battery assembly constituted of a plurality of electrically connected secondary batteries (for example, lithium ion batteries). The secondary battery constituting battery 18 is not limited to the lithium ion battery but another secondary battery (for example, a nickel metal hydride battery) may be applicable. A liquid electrolyte secondary battery or an all-solid-state secondary battery may be adopted as battery 18. Any power storage can be adopted as battery 18 and a large capacity capacitor can also be adopted.

Drive device 10 includes a planetary gear mechanism 20. Engine 13 and MG 14 are coupled to planetary gear mechanism 20. Planetary gear mechanism 20 is a single-pinion planetary gear and is arranged on an axis Cnt coaxial with an output shaft 22 of engine 13.

Planetary gear mechanism 20 includes a sun gear S, a ring gear R arranged coaxially with sun gear S, a pinion gear P meshed with sun gear S and ring gear R, and a carrier C holding pinion gear P in a rotatable and revolvable manner. Each of engine 13 and MG 14 is mechanically coupled to a drive wheel 24 with planetary gear mechanism 20 being interposed. Engine 13 has output shaft 22 coupled to carrier C. MG 14 has rotor shaft 23 coupled to sun gear S. Ring gear R is coupled to an output gear 21.

In planetary gear mechanism 20, carrier C serves as an input element, ring gear R serves as an output element, and sun gear S serves as a reaction force element. Torque output from engine 13 is input to carrier C. Planetary gear mechanism 20 transmits torque output from engine 13 to output shaft 22 by dividing torque into torque to sun gear S (and to MG 14) and torque to ring gear R (and to output gear 21). Ring gear R outputs torque to output gear 21 and reaction torque is applied to sun gear S by MG 14. Motive power output from planetary gear mechanism 20 (planetary gear) (that is, motive power output to output gear 21) is transmitted to drive wheel 24 through a driven gear 26, a countershaft 25, a drive gear 27, a differential gear 28, and driveshafts 32 and 33 which will be described below.

Drive device 10 further includes countershaft 25, driven gear 26, drive gear 27, differential gear 28, a drive gear 31, and driveshafts 32 and 33. Differential gear 28 corresponds to a final reduction gear and includes a ring gear 29.

Planetary gear mechanism 20 and MG 15 are configured such that motive power output from planetary gear mechanism 20 and motive power output from MG 15 are transmitted to drive wheel 24 as being combined. Specifically, output gear 21 coupled to ring gear R of planetary gear mechanism 20 is meshed with driven gear 26. Drive gear 31 attached to rotor shaft 30 of MG 15 is also meshed with driven gear 26. Countershaft 25 is attached to driven gear 26 and arranged in parallel to axis Cnt. Drive gear 27 is attached to countershaft 25 and meshed with ring gear 29 of differential gear 28. Driven gear 26 functions to combine torque output to rotor shaft 30 by MG 15 and torque output from ring gear R to output gear 21. Drive torque thus combined is transmitted to drive wheel 24 through driveshafts 32 and 33 extending laterally from differential gear 28.

Drive device 10 further includes a mechanical oil pump 36 and an electric oil pump 38. Oil pump 36 is provided coaxially with output shaft 22. Oil pump 36 is driven by engine 13. Oil pump 36 delivers lubricating oil to planetary gear mechanism 20, MG 14, MG 15, and differential gear 28 while engine 13 is on. Electric oil pump 38 is driven by electric power supplied by battery 18 or a not-shown another vehicle-mounted battery (for example, an auxiliary battery) and controlled by an HVECU 62 (see FIG. 3) which will be described later. Electric oil pump 38 delivers lubricating oil to planetary gear mechanism 20, MG 14, MG 15, and differential gear 28 while engine 13 is off. Lubricating oil delivered by each of oil pump 36 and electric oil pump 38 has a cooling function.

Figure 2:
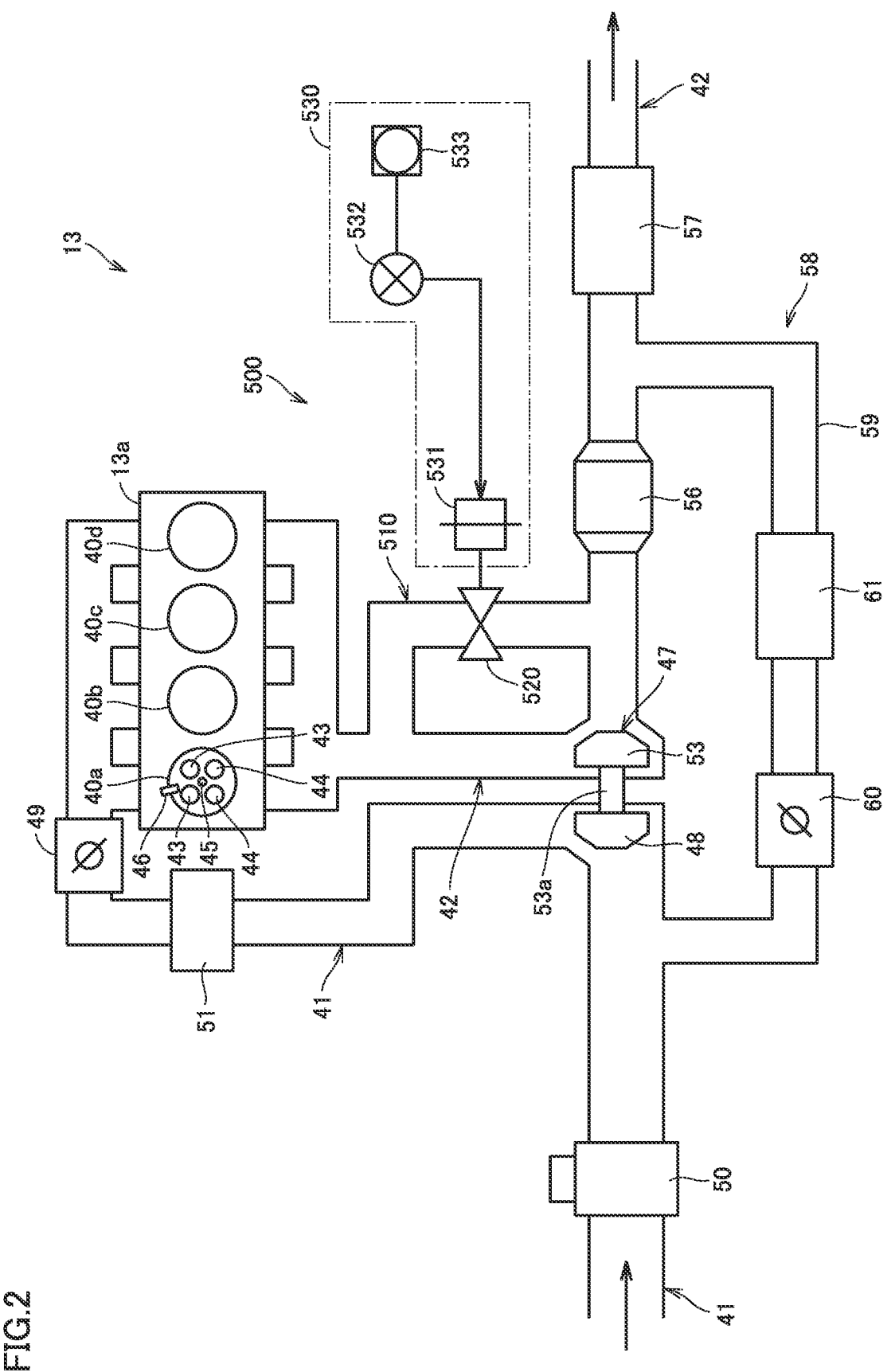
FIG. 2 is a diagram showing an engine of the hybrid vehicle according to the embodiment of the present disclosure.

FIG. 2 is a diagram showing a configuration of engine 13. Referring to FIG. 2, engine 13 is, for example, an in-line four-cylinder spark ignition internal combustion engine. Engine 13 includes an engine main body 13a including four cylinders 40a, 40b, 40c, and 40d. In engine main body 13a, four cylinders 40a, 40b, 40c, and 40d are aligned in one direction. Each of cylinders 40a, 40b, 40c, and 40d will be denoted as a "cylinder 40" below unless they are explained as being distinguished from one another.

An intake air passage 41 and an exhaust passage 42 are connected to each cylinder 40 of engine main body 13a. Intake air passage 41 is opened and closed by two intake valves 43 provided in each cylinder 40, and exhaust passage 42 is opened and closed by two exhaust valves 44 provided in each cylinder 40. An air fuel mixture of air and fuel (for example, gasoline) is generated by adding fuel to air supplied to engine main body 13a through intake air passage 41. Fuel is injected into cylinder 40 by an injector 46 provided, for example, for each cylinder 40 and the air fuel mixture is generated in cylinder 40. An ignition plug 45 provided for each cylinder 40 ignites the air fuel mixture in cylinder 40. Combustion is thus performed in each cylinder 40. Combustion energy generated at the time of combustion of the air fuel mixture in each cylinder 40 is converted to kinetic energy by a piston (not shown) in each cylinder 40 and output to output shaft 22 (FIG. 1). A fuel supply scheme is not limited to direct injection, and may be port injection or both of direct injection and port injection.

Engine 13 includes a turbocharger 47 that uses exhaust energy to boost suctioned air. Turbocharger 47 includes a compressor 48, a turbine 53, and a shaft 53a. Compressor 48 and turbine 53 are coupled to each other with shaft 53a being interposed and rotated together. Rotational force of turbine 53 rotated by receiving a flow of exhaust emitted from engine main body 13a is transmitted to compressor 48 through shaft 53a. As compressor 48 is rotated, intake air toward engine main body 13a is compressed and compressed air is supplied to engine main body 13a. Turbocharger 47 boosts suctioned air (that is, increases a density of air suctioned into engine main body 13a) by rotating turbine 53 and compressor 48 by using exhaust energy.

Compressor 48 is arranged in intake air passage 41. An air flow meter 50 is provided at a position upstream from compressor 48 in intake air passage 41. Air flow meter 50 outputs a signal in accordance with a flow rate of air that flows through intake air passage 41. An intercooler 51 is provided at a position downstream from compressor 48 in intake air passage 41. Intercooler 51 cools intake air compressed by compressor 48. A throttle valve (intake throttle valve) 49 is provided at a position downstream from intercooler 51 in intake air passage 41. Throttle valve 49 can regulate a flow rate of intake air that flows through intake air passage 41. In the embodiment, a valve continuously variable in opening (which is also referred to as a "continuously variable valve" below) within a range from a fully closed state to a fully opened state is adopted as throttle valve 49. Opening of throttle valve 49 is controlled by HVECU 62 (see FIG. 3) which will be described later. Air that flows into intake air passage 41 is supplied to each cylinder 40 of engine main body 13a sequentially through air flow meter 50, compressor 48, intercooler 51, and throttle valve 49 in this order.

Turbine 53 is arranged in exhaust passage 42. A start catalyst converter 56 and an aftertreatment apparatus 57 are provided downstream from turbine 53 in exhaust passage 42. In exhaust passage 42, a WGV apparatus 500 described below is further provided.

WGV apparatus 500 allows exhaust emitted from engine main body 13a to flow as bypassing turbine 53, and can adjust an amount of bypassed exhaust. WGV apparatus 500 includes a bypass passage 510, a waste gate valve (WGV) 520, and a WGV actuator 530.

Bypass passage 510 is connected to exhaust passage 42 and allows exhaust to flow therethrough as bypassing turbine 53. Bypass passage 510 is branched from a portion of exhaust passage 42 upstream from turbine 53 (for example, between engine main body 13a and turbine 53) and is merged with a portion of exhaust passage 42 downstream from turbine 53 (for example, between turbine 53 and start catalyst converter 56).

WGV 520 is arranged in bypass passage 510 and can regulate a flow rate of exhaust guided from engine main body 13a to bypass passage 510. As a flow rate of exhaust guided from engine main body 13a to bypass passage 510 increases, a flow rate of exhaust guided from engine main body 13a to turbine 53 decreases. Depending on opening of WGV 520, a flow rate of exhaust that flows into turbine 53 (and a boost pressure) is varied. As WGV 520 is closed (that is, closer to a fully closed state), a flow rate of exhaust that flows into turbine 53 increases and a pressure of suctioned air (that is, a boost pressure) is higher.

WGV 520 is a negative pressure driven valve driven by WGV actuator 530. WGV actuator 530 includes a negative pressure driven diaphragm 531, a negative pressure regulation valve 532, and a negative pressure pump 533. Diaphragm 531 is coupled to WGV 520 and WGV 520 is driven by a negative pressure introduced into diaphragm 531. In the embodiment, WGV 520 is a normally closed valve and opening of WGV 520 is larger as the negative pressure applied to diaphragm 531 is larger in magnitude. Negative pressure pump 533 is connected to diaphragm 531 with negative pressure regulation valve 532 being interposed.

Negative pressure pump 533 is a mechanical pump (for example, a vane type mechanical pump) driven by engine 13. Negative pressure pump 533 generates a negative pressure with motive power output to output shaft 22 (FIG. 1) of engine 13. While engine 13 is on, negative pressure pump 533 is also on, and when engine 13 is stopped, negative pressure pump 533 is also stopped. Negative pressure regulation valve 532 can regulate magnitude of a negative pressure applied to diaphragm 531. As opening of negative pressure regulation valve 532 is larger, a negative pressure applied to diaphragm 531 is larger in magnitude. Negative pressure regulation valve 532 is controlled by HVECU 62 (see FIG. 3) which will be described later. In the embodiment, a two-position electromagnetic valve that can alternatively select any one of a fully open (communicating) state and a fully closed (cut-off) state is adopted for negative pressure regulation valve 532. When a negative pressure generated by negative pressure pump 533 is no longer applied to diaphragm 531, a pressure applied to diaphragm 531 returns to the atmospheric pressure. WGV actuator 530 may include a relief valve (not shown) that opens a negative pressure pipe connected to diaphragm 531 to the atmosphere. The relief valve may be opened and closed in accordance with a pressure in the negative pressure pipe and may be in coordination with negative pressure regulation valve 532. The relief valve may be controlled by HVECU 62 (FIG. 3) which will be described later. As the relief valve is opened when negative pressure regulation valve 532 is closed, a rate of weakening (becoming closer to the atmospheric pressure) of the negative pressure applied to diaphragm 531 can be increased.

Exhaust emitted from engine main body 13a passes through any of turbine 53 and WGV 520 and emitted into the atmosphere after a harmful substance is removed therefrom by start catalyst converter 56 and aftertreatment apparatus 57. Aftertreatment apparatus 57 contains, for example, a three-way catalyst.

Engine 13 is provided with an exhaust gas recirculation (EGR) apparatus 58 that has exhaust flow into intake air passage 41. EGR apparatus 58 includes an EGR passage 59, an EGR valve 60, and an EGR cooler 61. EGR passage 59 allows some of exhaust to be taken out of exhaust passage 42 as EGR gas and guides EGR gas to intake air passage 41 by connecting a portion of exhaust passage 42 between start catalyst converter 56 and aftertreatment apparatus 57 and a portion of intake air passage 41 between compressor 48 and air flow meter 50 to each other. EGR valve 60 and EGR cooler 61 are provided in EGR passage 59. EGR valve 60 can regulate a flow rate of EGR gas that flows through EGR passage 59. EGR cooler 61 cools EGR gas that flows through EGR passage 59.

Figure 3:
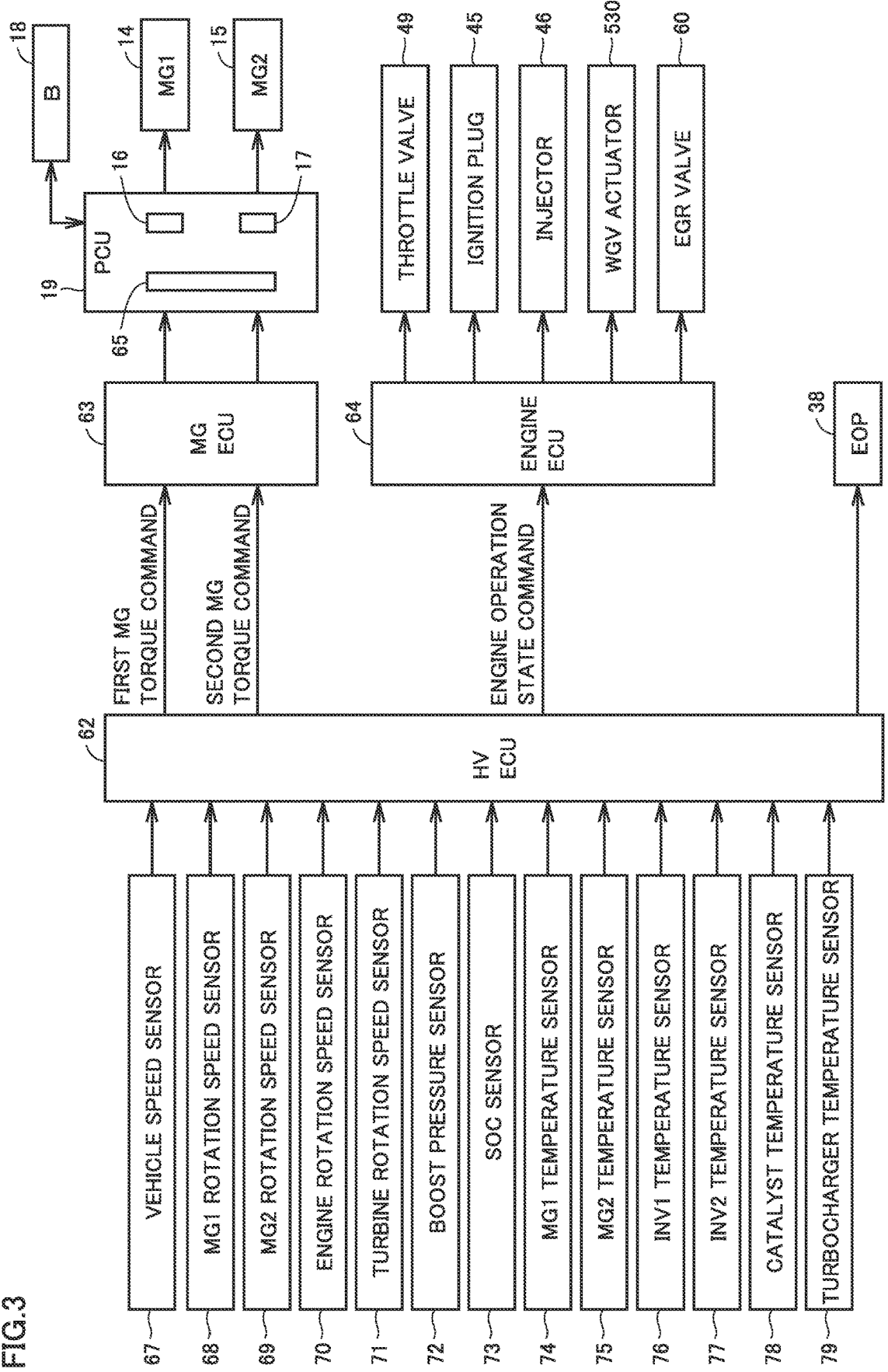
FIG. 3 is a diagram showing a control system of the hybrid vehicle according to the embodiment of the present disclosure.

FIG. 3 is a diagram showing a control system of the hybrid vehicle according to the embodiment. Referring to FIG. 3 together with FIGS. 1 and 2, the control system of the vehicle includes HVECU 62, an MGECU 63, and an engine ECU 64. A vehicle speed sensor 67, an MG1 rotation speed sensor 68, an MG2 rotation speed sensor 69, an engine rotation speed sensor 70, a turbine rotation speed sensor 71, a boost pressure sensor 72, an SOC sensor 73, an MG1 temperature sensor 74, an MG2 temperature sensor 75, an INV1 temperature sensor 76, an INV2 temperature sensor 77, a catalyst temperature sensor 78, and a turbocharger temperature sensor 79 are connected to HVECU 62.

Vehicle speed sensor 67 outputs a signal in accordance with a speed of the vehicle (that is, a traveling speed of the vehicle) to HVECU 62. MG1 rotation speed sensor 68 outputs a signal in accordance with a rotation speed of MG 14 to HVECU 62. MG2 rotation speed sensor 69 outputs a signal in accordance with a rotation speed of MG 15 to HVECU 62. Engine rotation speed sensor 70 outputs a signal in accordance with a rotation speed of output shaft 22 of engine 13 to HVECU 62. Turbine rotation speed sensor 71 outputs a signal in accordance with a rotation speed of turbine 53 of turbocharger 47 to HVECU 62. Boost pressure sensor 72 outputs a signal in accordance with a boost pressure of engine 13 to HVECU 62.

SOC sensor 73 outputs a signal in accordance with a state of charge (SOC) representing a ratio of a remaining charge amount to a full charge amount (that is, a power storage capacity) of battery 18 to HVECU 62. MG1 temperature sensor 74 outputs a signal in accordance with a temperature of MG 14 to HVECU 62. MG2 temperature sensor 75 outputs a signal in accordance with a temperature of MG 15 to HVECU 62. INV1 temperature sensor 76 outputs a signal in accordance with a temperature of first inverter 16 to HVECU 62. INV2 temperature sensor 77 outputs a signal in accordance with a temperature of second inverter 17 to HVECU 62. Catalyst temperature sensor 78 outputs a signal in accordance with a temperature of aftertreatment apparatus 57 to HVECU 62. Turbocharger temperature sensor 79 outputs a signal in accordance with a temperature at a prescribed portion in turbocharger 47 (for example, a temperature of turbine 53) to HVECU 62.

Figure 4:
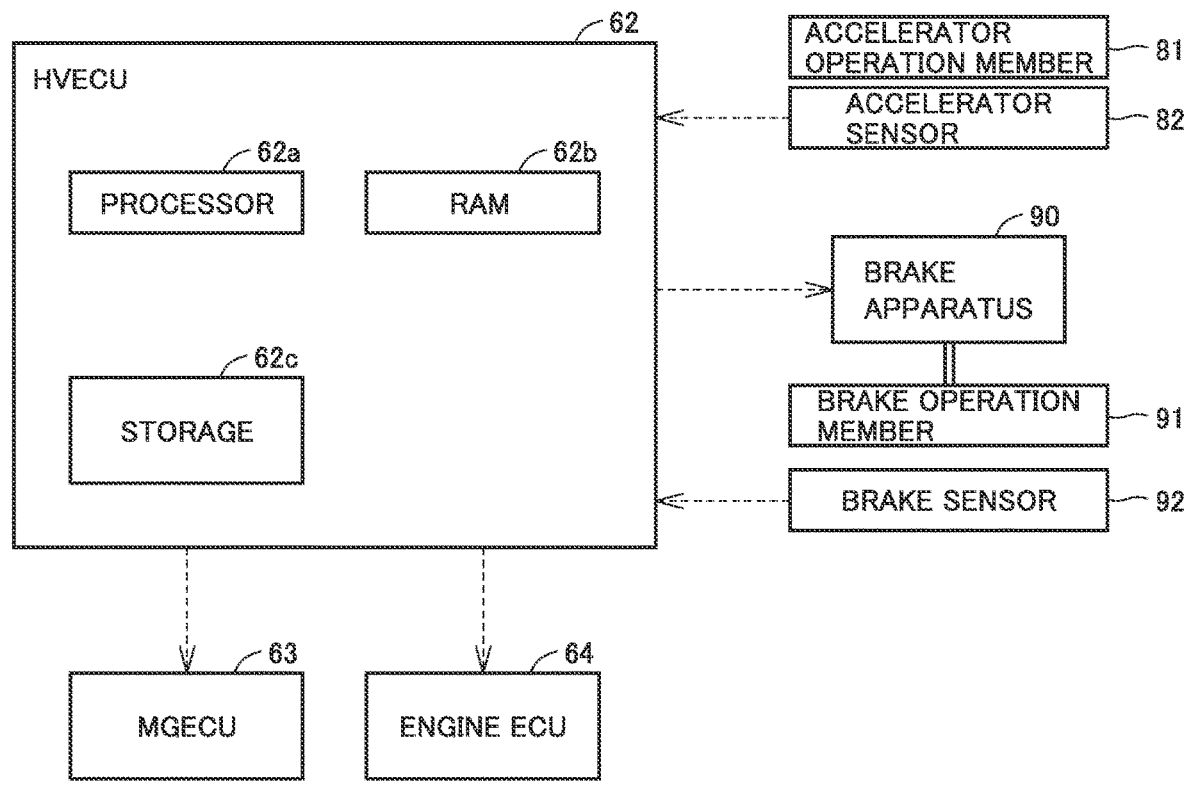
FIG. 4 is a diagram showing a configuration involved with control of acceleration and deceleration of the hybrid vehicle according to the embodiment of the present disclosure.

FIG. 4 is a diagram showing a configuration involved with control of acceleration and deceleration of the hybrid vehicle according to the embodiment. Referring to FIG. 4, HVECU 62 includes a processor 62a, a random access memory (RAM) 62b, and a storage 62c as well as input and output ports and a timer that are not shown. For example, a central processing unit (CPU) can be adopted as processor 62a. RAM 62b functions as a work memory that temporarily stores data to be processed by processor 62a. Storage 62c is capable of saving information that has been put therein. Storage 62c includes, for example, a read only memory (ROM) and a rewritable non-volatile memory. As processor 62a executes a program stored in storage 62c, various types of control of the vehicle are carried out. Other ECUs (for example, MGECU 63 and engine ECU 64) are also the same in hardware configuration as HVECU 62. Though HVECU 62, MGECU 63, and engine ECU 64 are separately provided in the embodiment, a single ECU may perform functions thereof.

The vehicle further includes an accelerator operation member 81 and an accelerator sensor 82. Accelerator operation member 81 is a member with which an operation for accelerating the vehicle (which is also referred to as an "accelerator operation" below) is performed by the driver. In the embodiment, the accelerator pedal represents accelerator operation member 81 and pressing of the accelerator pedal is the accelerator operation. Accelerator sensor 82 outputs a signal in accordance with an amount of accelerator operation (in the embodiment, an amount of pressing of the accelerator pedal) performed onto accelerator operation member 81 to HVECU 62. An accelerator position sensor can be adopted for accelerator sensor 82.

Accelerator sensor 82 detects whether or not a request for acceleration from the driver has been issued and an amount of acceleration requested by the driver (which is also referred to as "requested amount of acceleration" below). Whether or not a request for acceleration has been issued is indicated by whether or not an accelerator operation has been performed, and a requested amount of acceleration is indicated by an amount of accelerator operation. For example, pressing of the accelerator pedal by the driver means issuance of the acceleration request. The amount of pressing of the accelerator pedal at this time corresponds to the requested amount of acceleration. Quitting of pressing of the accelerator pedal by the driver (for example, the driver moving his/her foot away from the accelerator pedal) means that the acceleration request is changed from ON to OFF (that is, turn-off of the accelerator).

The vehicle further includes a brake apparatus 90, a brake operation member 91, and a brake sensor 92. Brake operation member 91 is a member with which the driver performs an operation for decelerating the vehicle (which is also referred to as a "brake operation" below). In the embodiment, a brake pedal represents brake operation member 91 and pressing of the brake pedal corresponds to the brake operation. Brake sensor 92 outputs a signal in accordance with an amount of brake operation onto brake operation member 91 (in the embodiment, an amount of pressing of the brake pedal) to HVECU 62. A stroke sensor can be adopted as brake sensor 92.

Brake sensor 92 detects whether or not a request for braking from the driver has been issued and an amount of braking requested by the driver (which is also referred to as a "requested amount of braking" below). Whether or not the request for braking has been issued is indicated by whether or not the brake operation has been performed, and the requested amount of braking is indicated by an amount of brake operation. For example, the driver not pressing the brake pedal means OFF of the request for braking. The vehicle is accelerated while the request for braking is OFF. Pressing of the brake pedal by the driver while the vehicle travels and the request for braking is OFF means that the request for braking is changed from OFF to ON (that is, turn-on of the brake).

Brake apparatus 90 applies braking force to all of the four wheels including drive wheel 24 (FIG. 1). Brake apparatus 90 is operable in accordance with an amount of brake operation by being physically connected to brake operation member 91. Brake apparatus 90 includes a brake actuator which will be described later and is electronically controllable by HVECU 62. Brake apparatus 90 according to the embodiment corresponds to an exemplary "electronically controllable brake apparatus."

In the embodiment, a hydraulic brake apparatus is adopted as brake apparatus 90. Brake apparatus 90 includes a master cylinder pressurized by a brake operation onto brake operation member 91, a brake mechanism provided for each wheel, and the brake actuator (none of which is shown). A power assist device that assists force with which the driver operates the brake (for example, a brake booster making use of a negative pressure of engine 13) may be provided in the master cylinder. The brake mechanism generates frictional braking force in the wheels by making use of a hydraulic pressure supplied from the master cylinder. The brake actuator can regulate a hydraulic pressure applied to the brake mechanism. The brake actuator is provided between the master cylinder and the brake mechanism and operates regardless of brake operation member 91. The operation by the brake actuator is controlled by HVECU 62.

The brake mechanism includes a caliper fixed to a vehicular body and a brake rotor that is fixed to the wheel and rotates integrally with the wheel. The caliper includes a wheel cylinder and a brake pad, and generates frictional braking force by pressing of the brake pad against the brake rotor by activation of the wheel cylinder by a pressure applied by brake oil (that is, a hydraulic pressure) supplied by the brake actuator. As the hydraulic pressure applied to the wheel cylinder is higher, frictional braking force is stronger.

The brake actuator includes a hydraulic circuit that supplies a hydraulic pressure supplied from the master cylinder to each wheel cylinder of the four wheels, a control valve (for example, a pressure reducing valve) provided in each hydraulic circuit, and a pump for regulating a hydraulic pressure (for example, a pressurization pump). A hydraulic sensor is provided in each of the master cylinder and the wheel cylinder and a detection signal from each hydraulic sensor is output to HVECU 62. HVECU 62 can regulate a hydraulic pressure applied to each wheel cylinder (and braking force applied to each wheel) by controlling the control valve and the pump of the brake actuator. An electric motor (for example, a motor that pushes a piston of the master cylinder) may be adopted instead of the pump.

During normal traveling of the vehicle, HVECU 62 controls brake apparatus 90 to generate braking force in each wheel in accordance with an amount of brake operation by the driver. During traveling in a specific situation (that is, during traveling different from traveling in a normal state), HVECU 62 controls the brake actuator to regulate a hydraulic pressure such that braking force different from that in normal traveling is generated in each wheel. Examples of brake control different from that in normal traveling include anti-slip control (traction control) at the time of start and acceleration (which is generally also referred to as a "TCS function"), vehicle stability control (which is generally also referred to as "VSC") at the time of turning, and anti-lock braking control (which is generally also referred to as an "ABS function") at the time of hard braking.

Referring again to FIG. 3, the vehicle can travel in an HV traveling mode and an EV traveling mode. Traveling in the HV traveling mode is referred to as "HV traveling" below and traveling in the EV traveling mode is referred to as "EV traveling" below. HV traveling is performed by engine 13 and MG 15. EV traveling is performed by MG 15 with engine 13 being stopped. HVECU 62 selects a suitable traveling mode depending on a situation and the vehicle travels in the selected traveling mode. HVECU 62 calculates requested driving force, for example, based on an accelerator position and a vehicle speed, and controls engine 13, MG 14, and MG 15 in coordination such that requested driving force is output to drive wheel 24. In HV traveling, torque obtained by combining torque output by engine 13 and torque output by MG 15 serves as traveling driving force. In EV traveling, torque output by MG 15 serves as traveling driving force. Torque to be generated by MG 15 is calculated such that requested driving force is output to drive wheel 24 (FIG. 1).

HVECU 62 controls an operating point of engine 13 to a target operating point. The operating point of engine 13 refers to a state of operation of engine 13 defined by engine torque and an engine rotation speed. HVECU 62 calculates requested engine power based on the traveling mode and requested driving force and determines a target operating point based on requested engine power. HVECU 62 sets as the target operating point, for example, an intersection between a line (an equal power line) at which engine power is equal to requested engine power and an optimal fuel efficiency line on a coordinate plane of the engine rotation speed and engine torque. A line that connects operating points of the engine at which fuel efficiency is highest on the coordinate plane of the engine rotation speed and engine torque to one another is defined as the optimal fuel efficiency line.

HVECU 62 can adjust a rotation speed of engine 13 by controlling a rotation speed of MG 14. HVECU 62 can arbitrarily control a rotation speed of MG 14 in accordance with magnitude of a current fed to MG 14 and a frequency thereof. Torque to be generated by MG 14 is calculated such that the operating point of engine 13 is set to the target operating point.

HVECU 62 outputs to engine ECU 64, a command for controlling engine 13. Engine ECU 64 controls throttle valve 49, ignition plug 45, injector 46, WGV actuator 530, and EGR valve 60 in accordance with a command from HVECU 62. HVECU 62 can control the engine by means of engine ECU 64. For example, when engine torque exceeds a threshold value, HVECU 62 makes a request to engine ECU 64 for forced induction, and when engine torque is equal to or smaller than the threshold value, it makes a request to engine ECU 64 for stop of forced induction. Engine ECU 64 controls WGV 520 to open and close in response to a request from HVECU 62. In order to suppress frequent opening and closing of WGV 520 (and on and off of forced induction), hysteresis may be set for the threshold value of engine torque (that is, a threshold value for on of forced induction being different from a threshold value for off of forced induction).

In the embodiment, HVECU 62 controls WGV 520 to fully be closed when forced induction is to be performed, and controls WGV 520 to fully be opened when forced induction is not to be performed. For example, when engine torque exceeds the threshold value while forced induction is off, HVECU 62 makes a request to engine ECU 64 for forced induction (that is, closing of WGV 520). When engine ECU 64 issues an instruction to close to negative pressure regulation valve 532 (FIG. 2) in WGV actuator 530 in response to the request, negative pressure regulation valve 532 is fully closed and a negative pressure generated by negative pressure pump 533 (FIG. 2) is no longer applied to diaphragm 531. WGV 520 is thus fully closed and forced induction is performed. When engine torque is equal to or smaller than the threshold value while forced induction is being performed, HVECU 62 makes a request to engine ECU 64 for stop of forced induction (that is, opening of WGV 520). When engine ECU 64 issues an instruction to open to negative pressure regulation valve 532 (FIG. 2) in WGV actuator 530 in response to the request, negative pressure regulation valve 532 is fully opened and a negative pressure generated by negative pressure pump 533 (FIG. 2) is applied to diaphragm 531. WGV 520 is thus fully opened and forced induction is stopped.

Since engine torque is not greater than the threshold value during deceleration of the vehicle, WGV 520 is normally fully opened. In the embodiment, however, when both of a first condition and a second condition which will be described later are satisfied during deceleration of the vehicle, HVECU 62 sets WGV 520 to fully be closed (see FIGS. 9 and 10).

HVECU 62 outputs a command for controlling each of MG 14 and MG 15 to MGECU 63. The vehicle further includes a power control unit (PCU) 19. MGECU 63 controls MG 14 and MG 15 by means of PCU 19. MGECU 63 generates a current signal (for example, a signal representing magnitude and a frequency of a current) corresponding to target torque of each of MG 14 and MG 15 in accordance with a command from HVECU 62 and outputs a generated current signal to PCU 19. HVECU 62 can control the motor by means of MGECU 63.

PCU 19 includes first inverter 16, second inverter 17, and a converter 65. Each of MG 14 and MG 15 is electrically connected to PCU 19. First inverter 16 and converter 65 convert electric power between battery 18 and MG 14. Second inverter 17 and converter 65 convert electric power between battery 18 and MG 15. PCU 19 has electric power stored in battery 18 supplied to each of MG 14 and MG 15, and has electric power generated by each of MG 14 and MG 15 supplied to battery 18. PCU 19 can control states of MGs 14 and 15 separately and for example, it can set MG 14 to a regeneration state (that is, a power generation state) while it can set MG 15 to a power running state. PCU 19 can supply electric power generated by one of MG 14 and MG 15 to the other. MG 14 and MG 15 can supply and receive electric power to and from each other.

Figure 5:
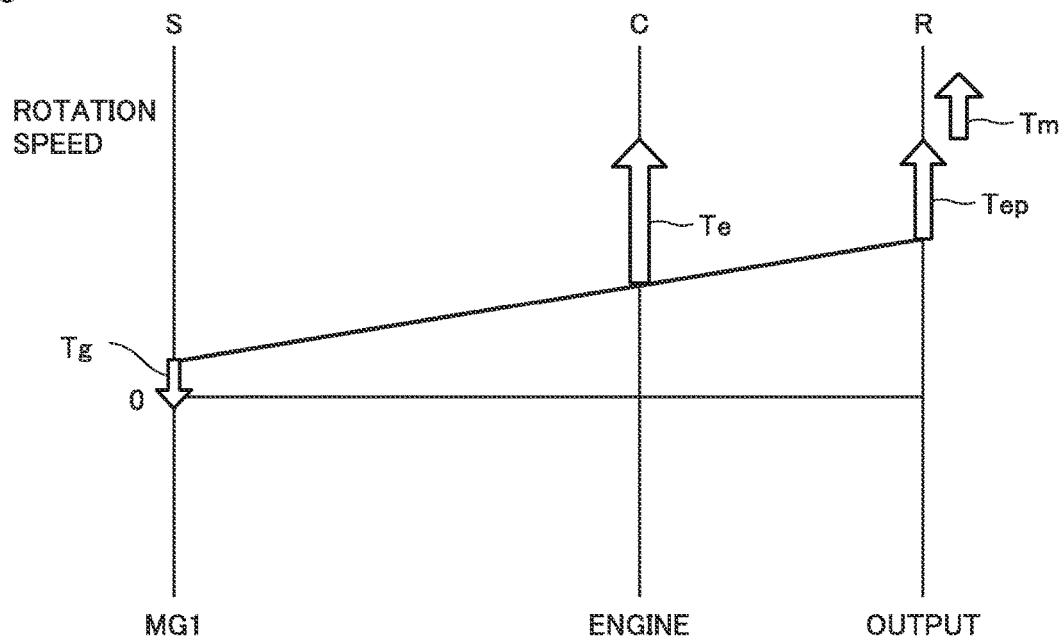
FIG. 5 is a nomographic chart showing exemplary relation among rotation speeds of rotary elements (a sun gear, a carrier, and a ring gear) of a planetary gear during low-speed HV traveling, in the hybrid vehicle according to the embodiment of the present disclosure.

FIG. 5 is a nomographic chart showing exemplary relation among rotation speeds of sun gear S, carrier C, and ring gear R of planetary gear mechanism 20 during low-speed HV traveling. Referring to FIG. 5, in exemplary low-speed HV traveling, positive torque Te is output from engine 13 and positive torque Tep corresponding to torque Te is output to ring gear R of planetary gear mechanism 20. In a steady state where a rotation speed of each of engine 13, MG 14, and MG 15 is constant, torque Tep is uniquely determined by torque Te and a planetary gear ratio of planetary gear mechanism 20. In order to transmit torque Te to ring gear R, reaction force against torque Te is applied to sun gear S of planetary gear mechanism 20. Torque Tg of MG 14 is thus negative.

In the example in FIG. 5, not only engine 13 but also MG 15 outputs positive torque Tm. Combined torque of torque Tep and torque Tm is transmitted to drive wheel 24 (FIG. 1). The vehicle travels with traveling driving force generated in each of engine 13 and MG 15. HVECU 62 can control MG 14 to perform regenerative electricity generation by making use of reaction torque (torque Tg) of MG 14. Electric power generated in regenerative electricity generation may be supplied to MG 15 or stored in battery 18.

Figure 6:
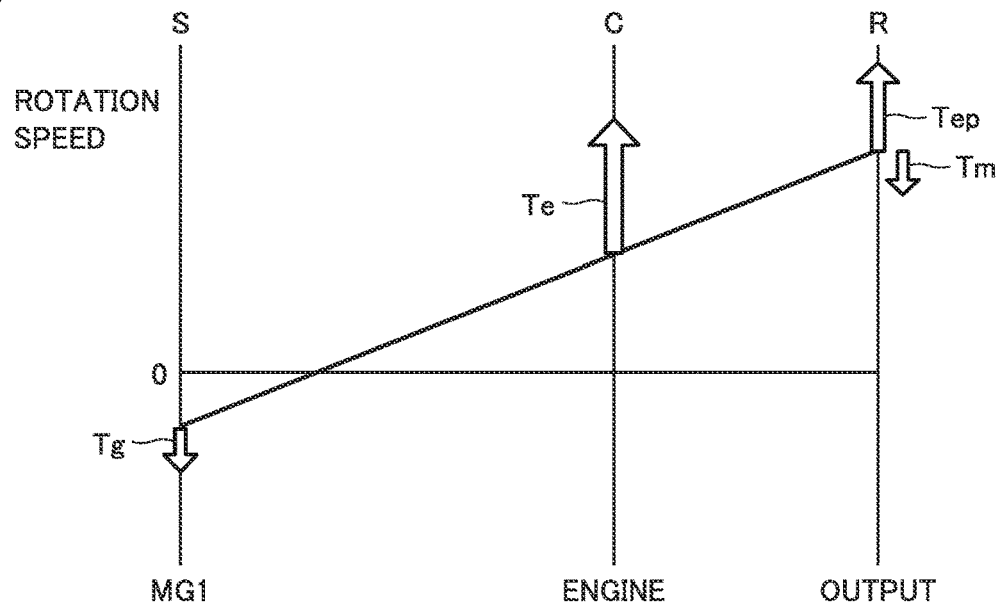
FIG. 6 is a nomographic chart showing exemplary relation among rotation speeds of rotary elements (the sun gear, the carrier, and the ring gear) of the planetary gear during high-speed HV traveling, in the hybrid vehicle according to the embodiment of the present disclosure.

FIG. 6 is a nomographic chart showing exemplary relation among rotation speeds of sun gear S, carrier C, and ring gear R of planetary gear mechanism 20 during high-speed HV traveling. Referring to FIG. 6, in exemplary high-speed HV traveling, positive torque Te is output from engine 13 and positive torque Tep corresponding to torque Te is output to ring gear R of planetary gear mechanism 20. Reaction torque output from MG 14 (that is, torque Tg of MG 14) is negative. Since a vehicle speed is high in the example in FIG. 6, MG 14 is in a negative rotation state. Since MG 14 outputs negative torque in negative rotation, it enters a power running state. On the other hand, MG 15 generates electric power in order to provide electric power consumed by MG 14, and electric power generated by MG 15 is supplied to MG 14. Therefore, torque Tm output from MG 15 is negative. Combined torque of torque Tep (positive torque) and torque Tm (negative torque) is positive and positive torque is transmitted to drive wheel 24 (FIG. 1).

Figure 7:
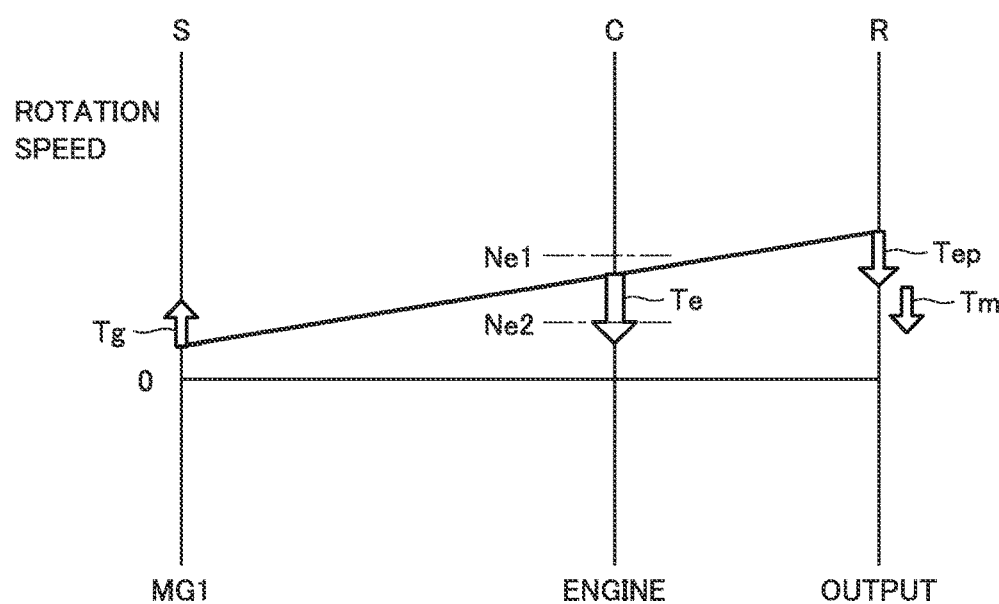
FIG. 7 is a nomographic chart for illustrating engine brake control during low-speed HV traveling shown in FIG. 5, in the hybrid vehicle according to the embodiment of the present disclosure.

FIG. 7 is a nomographic chart for illustrating engine brake control during low-speed HV traveling shown in FIG. 5. Referring to FIG. 7, HVECU 62 carries out engine brake control described below when a prescribed first condition is satisfied during traveling of the vehicle. In the embodiment, when the driver turns off the accelerator while a rotation speed of engine 13 is equal to or higher than a prescribed speed Ne2 (which is also simply denoted as "Ne2" below), the first condition is satisfied. Ne2 according to the embodiment corresponds to an exemplary "second speed" according to the present disclosure.

HVECU 62 controls ignition plug 45 and injector 46 to cut off fuel and stop ignition so as to stop combustion in engine 13. Negative torque Te is thus output from engine 13 and negative torque Tep (that is, deceleration torque) corresponding to torque Te is output from ring gear R of planetary gear mechanism 20. Furthermore, HVECU 62 controls MG 14 to perform motoring to output reaction torque (that is, positive torque Tg). Since MG 14 outputs positive torque in positive rotation, it enters the power running state. On the other hand, MG 15 generates electric power for providing electric power consumed by MG 14, and electric power generated by MG 15 is supplied to MG 14. Therefore, torque Tm output from MG 15 is negative (that is, deceleration torque). Combined torque of torque Tep and torque Tm is negative (that is, deceleration torque) and deceleration torque is transmitted to drive wheel 24 (FIG. 1). Negative torque resulting from torque Tep corresponds to braking force applied by engine brake. Negative torque resulting from torque Tm corresponds to braking force applied by regenerative braking. Brake of the vehicle (that is, engine brake and regenerative braking) is thus applied.

Figure 8:
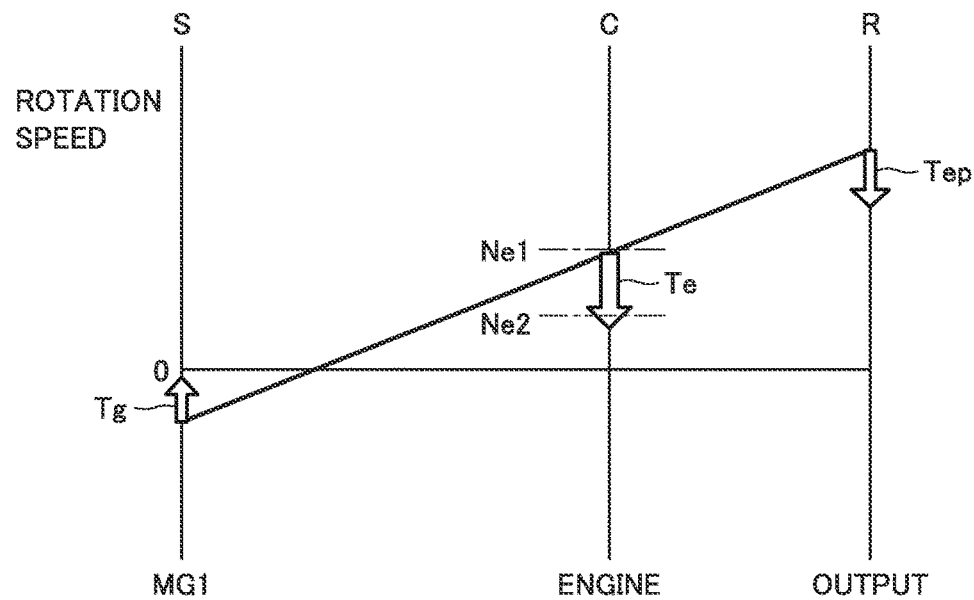
FIG. 8 is a nomographic chart for illustrating engine brake control during high-speed HV traveling shown in FIG. 6, in the hybrid vehicle according to the embodiment of the present disclosure.

FIG. 8 is a nomographic chart for illustrating engine brake control during high-speed HV traveling shown in FIG. 6. Referring to FIG. 8, when the first condition is satisfied during traveling of the vehicle, HVECU 62 controls ignition plug 45 and injector 46 to cut off fuel and stop ignition so as to stop combustion in engine 13. Negative torque Te is thus output from engine 13 and negative torque Tep (that is, deceleration torque) corresponding to torque Te is output from ring gear R of planetary gear mechanism 20. Furthermore, HVECU 62 controls MG 14 to perform motoring to output reaction torque (that is, positive torque Tg). Since MG 14 outputs positive torque in negative rotation, it generates electric power. HVECU 62 controls MG 14 to output electric power generated thereby to battery 18. HVECU 62 controls MG 15 not to generate torque. When battery 18 is not overcharged, HVECU 62 controls MG 15 to apply regenerative braking and to output electric power generated thereby to battery 18. HVECU 62 may determine whether or not battery 18 is overcharged by regenerative braking, based on an SOC of battery 18. Under engine brake control as above as well, combined torque of torque Tep and torque Tm is negative (that is, deceleration torque) and deceleration torque is transmitted to drive wheel 24 (FIG. 1). Negative torque resulting from torque Tep corresponds to braking force applied by engine brake. Brake of the vehicle (that is, engine brake) is thus applied.

Since engine torque decreases during deceleration of the vehicle, HVECU 62 requests engine ECU 64 to stop forced induction and to fully open WGV 520. When fuel is cut off (and combustion is stopped) in engine brake control (see FIGS. 7 and 8) described above, HVECU 62 controls the position (that is, opening) of throttle valve 49 to maintain engine main body 13*a* in the combustion resumable state for preparation for resumption of combustion. HVECU 62 controls throttle valve 49, for example, to achieve lowest charging efficiency at which combustion in engine main body 13*a* can be performed.

Though not shown, EV traveling is carried out while engine 13 is not rotating. Therefore, in EV traveling, the rotation speed of carrier C is set to 0. HVECU 62 can control the vehicle to stop by controlling engine 13 and MGs 14 and 15 to set the rotation speed of each of sun gear S, carrier C, and ring gear R to 0.

In the hybrid vehicle according to the embodiment, engine 13 may be a turbocharged downsizing engine. When the turbocharged downsizing engine is adopted as engine 13, loss in engine 13 is lessened by downsizing and hence braking force applied by engine brake is weakened. Therefore, even though fuel for engine 13 is cut off during deceleration of the vehicle, sufficient braking force by engine brake may not be obtained.

The driver can activate brake apparatus 90 by performing a brake operation onto brake operation member 91. Brake apparatus 90 generates braking force in accordance with an amount of the brake operation in each wheel of the vehicle to apply braking force to the vehicle. Even though sufficient braking force is not obtained by engine brake, the vehicle can be decelerated by compensation for insufficient braking force by brake apparatus 90. Braking by brake apparatus 90, however, is not necessarily high in energy efficiency. Therefore, when brake apparatus 90 is excessively relied on, energy efficiency of the vehicle may deteriorate. In order to avoid deterioration of energy efficiency of the vehicle, sufficient large braking force is desirably obtained by engine brake.

Then, HVECU 62 of the hybrid vehicle according to the embodiment carries out engine brake control described below when a prescribed second condition in addition to the first condition described previously is satisfied during deceleration of the vehicle by engine brake (for example, torque Tep shown in FIGS. 7 and 8). In the embodiment, the second condition is satisfied when the rotation speed of engine 13 is equal to or higher than a prescribed speed Ne1 (which is also simply denoted as "Ne1" below). Ne1 represents a rotation speed higher than Ne2. HVECU 62 according to the embodiment corresponds to an exemplary "controller" according to the present disclosure. Ne1 according to the embodiment corresponds to an exemplary "first speed" according to the present disclosure.

Figure 9:
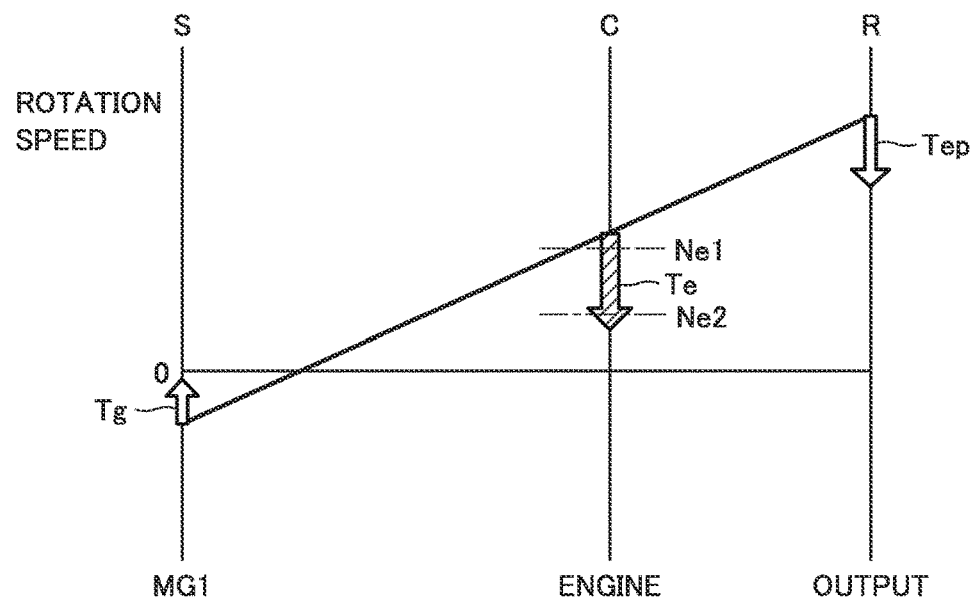
FIG. 9 is a nomographic chart for illustrating engine brake control carried out when the second condition is satisfied in the hybrid vehicle according to the embodiment of the present disclosure.

FIG. 9 is a nomographic chart for illustrating engine brake control carried out when the second condition is satisfied. Referring to FIG. 9, when the second condition in addition to the first condition described previously is satisfied during deceleration of the vehicle, HVECU 62 sets opening of throttle valve 49 to prescribed first opening or larger and sets opening of WGV 520 to prescribed second opening or smaller. In the embodiment, a fully opened state is defined as first opening and a fully closed state is defined as second opening. Therefore, when the second condition in addition to the first condition described previously is satisfied during deceleration of the vehicle, motoring by MG 14 described previously is performed with throttle valve 49 being fully opened and WGV 520 being fully closed (that is, in the turbocharged valve state). In this case as well, as a result of stop of combustion in engine 13, negative torque Tep (that is, deceleration torque) corresponding to torque Te is output from ring gear R of planetary gear mechanism 20. Throttle valve 49 and WGV 520, however, are in the turbocharged valve state and hence negative torque Tep is larger toward the negative side. More specifically, in the turbocharged valve state, forced induction by turbocharger 47 is performed and charging efficiency of engine 13 and a back pressure of engine 13 both become higher. Therefore, as motoring described previously is performed in the turbocharged valve state, resistance of engine 13 is higher than when the second condition is not satisfied (for example, the example in FIG. 8) and negative torque Tep is larger toward the negative side. Negative torque Tep being larger toward the negative side means that stronger braking force is applied by engine brake. Thus, the hybrid vehicle according to the embodiment readily ensures sufficient braking force by engine brake during deceleration of the vehicle.

Figure 10:
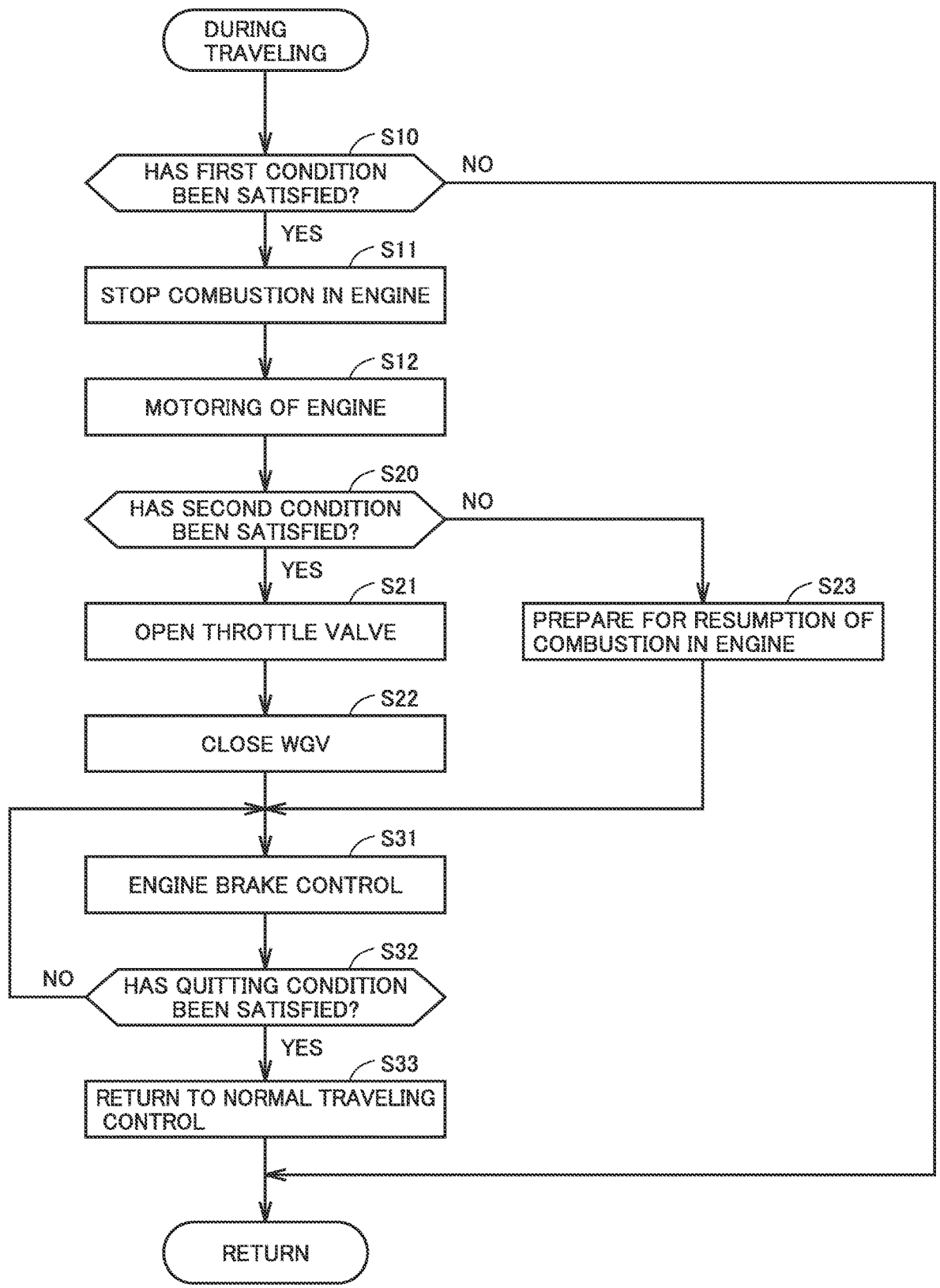
FIG. 10 is a flowchart showing a procedure in processing for traveling control performed by the controller of the hybrid vehicle according to the embodiment of the present disclosure.

FIG. 10 is a flowchart showing a procedure in processing for traveling control performed by HVECU 62. Processing shown in the flowchart is repeatedly performed as being invoked from a main routine (not shown) during traveling of the vehicle. Though not shown, traveling control without engine brake control (that is, processing in S11 and later) is carried out in parallel to the process in FIG. 10. Hereinafter, traveling control without engine brake control is also referred to as "normal traveling control." Under normal traveling control, engine 13 is stopped during EV traveling and the engine is controlled during HV traveling in accordance with the optimal fuel efficiency line described previously. When the driver turns off the accelerator while the rotation speed of engine 13 is lower than Ne2 in normal traveling control, engine 13 is in the idle state.

Referring to FIG. 10 together with FIG. 3, in a step (which is also simply denoted as "S" below) 10, HVECU 62 determines whether or not the first condition is satisfied. The first condition is satisfied when both of the condition that the rotation speed of engine 13 is equal to or higher than Ne2 and the condition that the acceleration request from the driver is changed from ON to OFF (that is, the accelerator being turned off) are simultaneously satisfied, and the first condition is not satisfied when one of them is not satisfied. When the first condition is not satisfied (NO in S10), the process returns to the main routine. When the first condition is satisfied (YES in S10), the process proceeds to S11.

In S11, HVECU 62 controls ignition plug 45 and injector 46 to cut off fuel and stop ignition so as not to allow combustion in engine 13. In succession, in S12, HVECU 62 controls MG 14 to perform motoring.

In S20, HVECU 62 determines whether or not the second condition is satisfied. The second condition is satisfied when the rotation speed of engine 13 is equal to or higher than Ne1 (>Ne2) and the second condition is not satisfied when the rotation speed of engine 13 is lower than Ne1.

When the second condition is not satisfied (NO in S20), the process proceeds to S31 through S23. In S23, HVECU 62 sets engine main body 13a to be in the combustion resumable state for preparation for resumption of combustion. Specifically, HVECU 62 controls the position of throttle valve 49 so as to maintain engine main body 13a in the combustion resumable state. HVECU 62 controls throttle valve 49 so as to achieve charging efficiency at which combustion in engine main body 13a can be performed with WGV 520 being fully opened. The position of throttle valve 49 is controlled, for example, to an intermediate position (that is, the position at which opening is larger than the fully closed state and smaller than the fully opened state). When the accelerator is turned off, WGV 520 is fully opened under normal traveling control. HVECU 62 maintains WGV 520 in the fully opened state in S23.

When the second condition is satisfied (YES in S20), the process proceeds to S31 through S21 and S22. HVECU 62 controls throttle valve 49 to fully be opened in S21 and controls WGV 520 to fully be closed in S22.

In S31, HVECU 62 carries out engine brake control. In engine brake control, HVECU 62 controls MG 14 to continue motoring started in S12 by maintaining engine 13 in which combustion has been stopped in S11 in a non-combustion state. HVECU 62 controls MG14 to generate reaction torque (that is, positive torque) against engine torque (that is, negative torque) by motoring while combustion in engine 13 remains stopped. Deceleration torque (that is, negative torque) corresponding to engine torque is thus output from planetary gear mechanism 20 (that is, the planetary gear). When the second condition is satisfied (that is, when the processing in S31 is performed after S21 and S22), motoring is performed in the turbocharged valve state so that resistance in engine 13 is higher than when the second condition is not satisfied (that is, processing in S31 is performed after S23) and deceleration torque (and braking force applied by engine brake) increases.

After the processing in S31, HVECU 62 determines in S32 whether or not a condition for quitting engine brake control is satisfied. In the embodiment, the quitting condition is satisfied when the driver performs an accelerator operation (that is, an acceleration request from the driver is issued). During a period until the quitting condition is satisfied (that is, while determination as NO is made in S32), engine brake control is continued by repetition of S31 and S32.

When the condition for quitting engine brake control is satisfied (YES in S32), HVECU 62 sets in S33, traveling control of the vehicle back to normal traveling control from engine brake control (S31). Thereafter, the process returns to the main routine.

HVECU 62 of the hybrid vehicle according to the embodiment performs a method of braking the hybrid vehicle including steps A to D described below.

In step A, HVECU 62 determines whether or not a prescribed first condition is satisfied during traveling of the hybrid vehicle (S10 in FIG. 10).

In step B, when HVECU 62 determines that the first condition has been satisfied (YES in S10 in FIG. 10), HVECU 62 stops combustion in engine 13 and performs motoring by MG 14 such that the planetary gear outputs deceleration torque (S11, S12, and S31 in FIG. 10).

In step C, HVECU 62 determines whether or not a prescribed second condition is satisfied at the time of start of motoring (for example, immediately after start of motoring) (S20 in FIG. 10).

In step D, when HVECU 62 determines that the second condition is satisfied (YES in S20 in FIG. 10), HVECU 62 sets opening of throttle valve 49 to prescribed first opening or larger (for example, the fully opened state) and sets opening of WGV 520 to prescribed second opening or smaller (for example, the fully closed state) (S21 and S22 in FIG. 10).

According to the method, sufficient braking force is readily ensured by engine brake during deceleration of the hybrid vehicle.

In the embodiment, when the second condition is not satisfied (NO in S20 in FIG. 10), engine main body 13a is set to the combustion resumable state without setting throttle valve 49 and WGV 520 to the turbocharged valve state (S23 in FIG. 10). The engine rotation speed at the time when the second condition is satisfied is equal to or higher than Ne1. A return lag at the time of resumption of combustion is thus suppressed.

Figure 11:
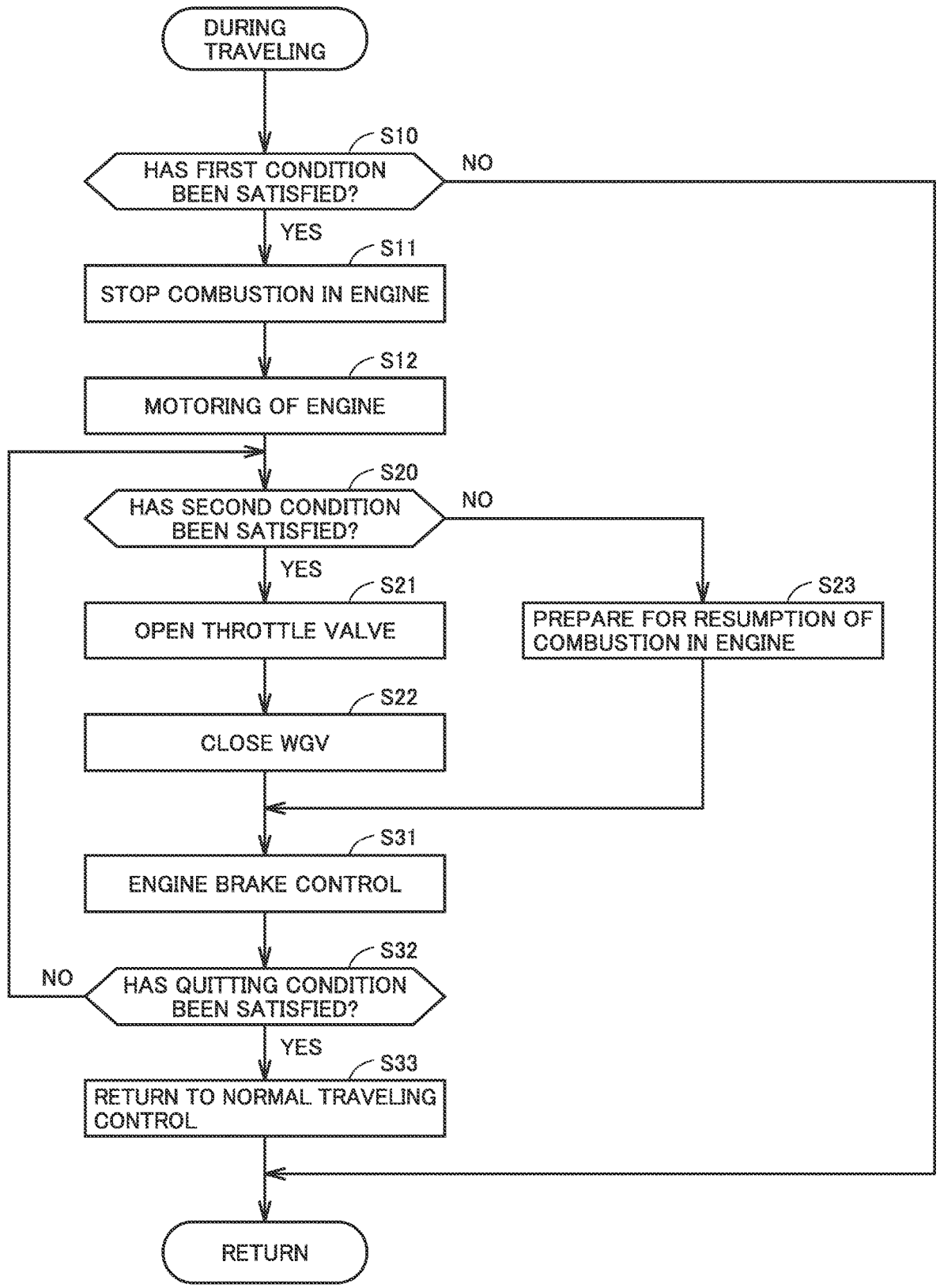
FIG. 11 is a diagram showing a first modification of traveling control shown in FIG. 10.

Timing to make determination (second determination) as to whether or not the second condition is satisfied can be modified as appropriate. FIG. 11 is a diagram showing a first modification of traveling control shown in FIG. 10.

Referring to FIG. 11, in the first modification, when determination as NO is made in S32, the process returns to S20 and second determination (S20) is repeatedly made not only at the time of start of motoring but also during engine brake control (S31) (and during motoring). According to such processing in FIG. 11, when the engine rotation speed immediately after stop of combustion is equal to or higher than Ne1 but when the engine rotation speed becomes lower than Ne1 during engine brake control (S31) (that is, before resumption of combustion), engine main body 13a can be set to the combustion resumable state through the processing in S23.

In the embodiment, during normal traveling of the vehicle, braking force in accordance with an amount of brake operation by a driver is applied to each wheel by brake apparatus 90. Specifically, during normal traveling of the vehicle, unless the driver performs the brake operation, brake apparatus 90 is not activated. During normal traveling of the vehicle, whenever the driver performs the brake operation, brake apparatus 90 is activated. Without being limited as such, brake apparatus 90 may be activated while the brake operation is not being performed during normal traveling of the vehicle. For example, brake apparatus 90 may be activated when the accelerator is turned off. Alternatively, when an amount of brake operation is small in spite of the brake operation by the driver during normal traveling of the vehicle, brake apparatus 90 does not have to be activated.

HVECU 62 may not activate brake apparatus 90 simply in response to turn-on of the brake but may activate brake apparatus 90 when a requested amount of braking from the driver exceeds a prescribed amount. Then, the first condition may be satisfied not in response to turn-off of the accelerator but in response to turn-on of the brake. In other words, the first condition may be satisfied when the driver turns on the brake while the rotation speed of engine 13 is equal to or higher than Ne2 (<Ne1). In the modification, Ne2 corresponds to an exemplary "third speed" according to the present disclosure.

HVECU 62 may carry out coordinated brake control of engine brake applied by engine 13, regenerative braking applied by MG 15, and hydraulic brake applied by brake apparatus 90. When braking force applied by engine brake and regenerative braking is insufficient, HVECU 62 may control brake apparatus 90 to compensate for insufficient braking force.

Figure 12:
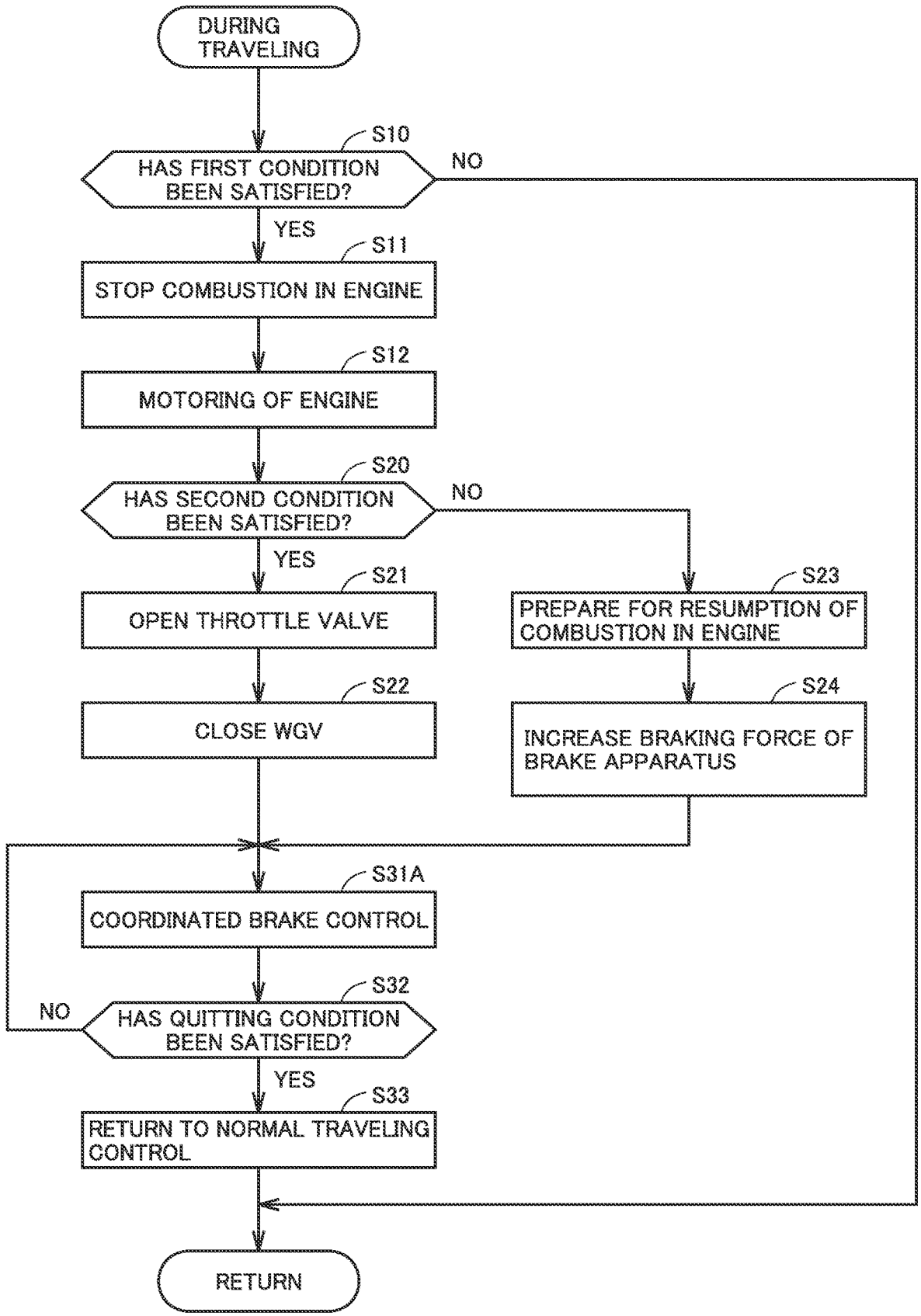
FIG. 12 is a diagram showing a second modification of traveling control shown in FIG. 10.

FIG. 12 is a diagram showing a second modification of traveling control shown in FIG. 10. Referring to FIG. 12, when the first condition is satisfied (YES in S10) and when the second condition is not satisfied (NO in S20) during traveling of the vehicle, HVECU 62 determines that engine brake is insufficient and increases braking force applied by brake apparatus 90 in S24. HVECU 62 then carries out coordinated brake control in S31A. When the second condition is not satisfied (NO in S20), braking force applied by brake apparatus 90 under coordinated brake control (S31A) is higher than when the second condition is satisfied (YES in S20). When the second condition is satisfied (YES in S20), HVECU 62 may determine that engine brake is sufficient and may not activate brake apparatus 90 under coordinated brake control (S31A).

Figure 13:
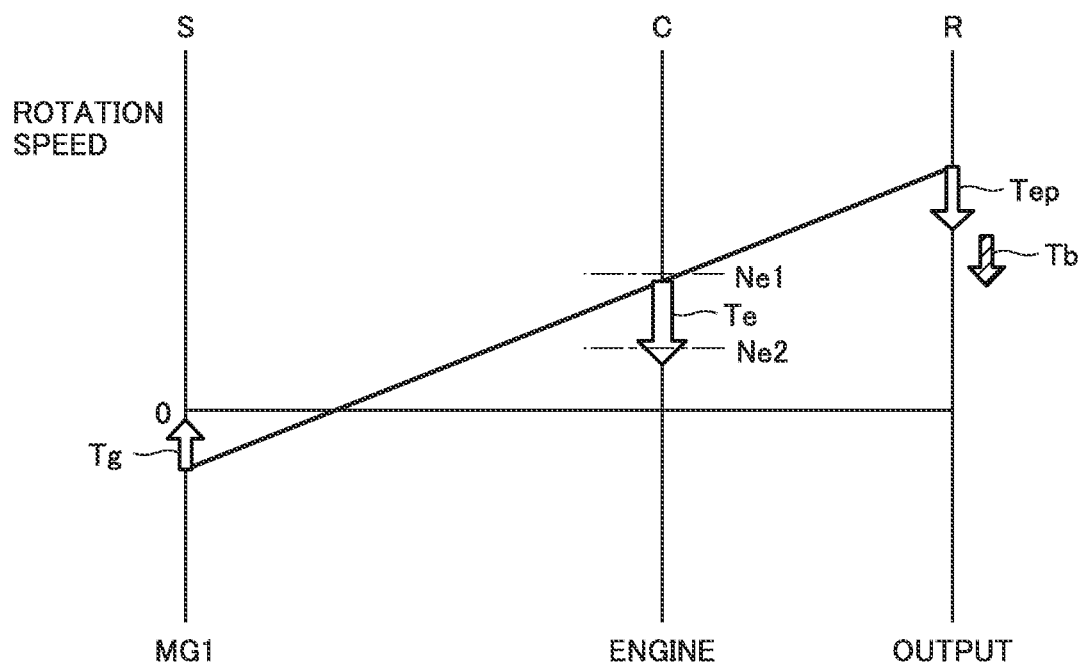
FIG. 13 is a nomographic chart for illustrating coordinated brake control carried out when the second condition is not satisfied in the second modification shown in FIG. 12.

FIG. 13 is a nomographic chart for illustrating coordinated brake control carried out when the second condition is not satisfied. Referring to FIG. 13 together with FIG. 12, HVECU 62 controls MG 14 to perform motoring and controls planetary gear mechanism 20 (that is, the planetary gear) to output deceleration torque while combustion in engine 13 is stopped under coordinated brake control (S31A). When the second condition is not satisfied, braking force described above (that is, braking force larger than when the second condition is satisfied) is set for brake apparatus 90 (S24). HVECU 62 carries out coordinated brake control (S31A) by means of brake apparatus 90 and applies negative torque (that is, deceleration torque) to each wheel. Therefore, negative torque Tb generated by brake apparatus 90 (that is, deceleration torque) in addition to negative torque Tep (that is, deceleration torque corresponding to torque Te) output from planetary gear mechanism 20 is applied to drive wheel 24 of the vehicle.

When both of the first condition and the second condition are satisfied (YES in S20), HVECU 62 (see FIGS. 12 and 13) according to the second modification sets throttle valve 49 and WGV 520 to the turbocharged valve state to reinforce braking force applied by engine brake. On the other hand, when only the first condition is satisfied (NO in S20), the HVECU increases braking force applied by brake apparatus 90 instead of setting throttle valve 49 and WGV 520 to the turbocharged valve state. By doing so, insufficiency in braking force applied by engine brake can be compensated for by brake apparatus 90. For example, total braking force applied by engine brake, regenerative braking, and hydraulic braking can substantially be equal in both of a case where the second condition is satisfied (YES in S20) and a case where the second condition is not satisfied (NO in S20). Thus, variation in braking force depending on whether or not the second condition is satisfied regardless of the brake operation performed by the driver is suppressed and the driver is less likely to feel discomfort during deceleration of the vehicle.

The first condition, the second condition, and the quitting condition shown in the embodiment are merely by way of example. Each of the first condition, the second condition, and the quitting condition can be modified as appropriate. Though the second condition is satisfied when a requirement (A-1) below is satisfied in the embodiment, any one of a requirement (A-2) and a requirement (A-3) shown below may be adopted instead of the requirement (A-1).

(A-1) The rotation speed of engine 13 is equal to or higher than prescribed speed Ne1.

(A-2) An SOC of battery 18 is equal to or higher than a prescribed SOC value.

(A-3) MG 14 is in a negative rotation state.

When the requirement (A-2) is satisfied, an amount of electric power that can be stored in battery 18 is small. Therefore, when electric power generated by regenerative braking by MG 15 is input to battery 18, battery 18 may be overcharged. When the second condition is satisfied, HVECU 62 increases braking force applied by engine brake by setting throttle valve 49 and WGV 520 to the turbocharged valve state. As the second condition is satisfied at the time when the requirement (A-2) is satisfied, sufficient braking force is readily obtained without applying regenerative braking when the amount of electric power that can be stored in battery 18 is small. Without application of regenerative braking, overcharging of battery 18 is suppressed. The prescribed SOC value may be set, for example, within a range not lower than 70% and not higher than 100%.

When the requirement (A-3) is satisfied during deceleration of the vehicle, MG 14 is in the negative rotation state and MG 14 is in the power generation state (see FIG. 9). As the second condition is satisfied while the requirement (A-3) is satisfied, HVECU 62 can set throttle valve 49 and WGV 520 to the turbocharged valve state to thereby increase braking force applied by engine brake when electric power generated by regenerative braking by MG 15 cannot be consumed for driving MG 14. With increase in braking force applied by engine brake, sufficient braking force is readily obtained without applying regenerative braking. Without application of regenerative braking, overcharging of battery 18 is suppressed.

The second condition may be satisfied when two requirements selected from the requirements (A-1) to (A-3) or all of the three requirements are satisfied. Each of the first condition, the second condition, and the quitting condition may be fixed or variable depending on a situation. At least one of the first condition, the second condition, and the quitting condition may be modified by a user.

The configuration of the brake apparatus included in the hybrid vehicle can be modified as appropriate without being limited to the configuration of brake apparatus 90 described previously. A known electric brake can be adopted for the electronically controllable brake apparatus. It is not essential to adopt the electronically controllable brake apparatus as the brake apparatus mounted on the hybrid vehicle.

The configuration of engine 13 is not limited to the configuration shown in FIG. 2 and can be modified as appropriate. For example, throttle valve 49 may be provided between air flow meter 50 and compressor 48 in intake air passage 41. A layout of the cylinders is not limited to the in-line layout either, and may be a V layout or a horizontal layout. The number of cylinders and valves can also arbitrarily be modified.

In the embodiment, binary control such as on and off of forced induction (that is, a high boost pressure and a low boost pressure) is carried out. HVECU 62, however, may regulate a boost pressure to desired magnitude by continuously controlling the position (that is, opening) of WGV 520 within a range from a fully closed state to a fully opened state. A continuously variable valve may be adopted as negative pressure regulation valve 532 so that magnitude of a negative pressure to be applied to diaphragm 531 can continuously be regulated. In the configuration shown in FIG. 2, negative pressure regulation valve 532 does not have to be provided and an electric pump may be adopted as negative pressure pump 533. HVECU 62 may regulate magnitude of a negative pressure to be applied to diaphragm 531 by controlling an amount of drive of the electric pump. WGV 520 may be a normally open valve. A scheme for driving WGV 520 is not limited to a negative pressure but any scheme or an electric scheme is applicable.

When the second condition is satisfied, HVECU 62 sets opening of throttle valve 49 to first opening or larger and sets opening of WGV 520 to second opening or smaller. Though the fully opened state is defined as first opening and the fully closed state is defined as second opening in the embodiment, each of first opening and second opening can arbitrarily be set. For example, first opening may be set to opening larger than 50% and smaller than the fully opened state, and second opening may be set to opening larger than the fully closed state and smaller than 50%.

A gasoline engine is adopted as engine 13 in the embodiment. Without being limited as such, any internal combustion engine can be adopted as engine 13 and a diesel engine can also be adopted.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A hybrid vehicle comprising:
   a drive wheel;
   an engine, a first motor generator, and a second motor generator mechanically coupled to the drive wheel; and
   a controller that controls the engine, the first motor generator, and the second motor generator,
   the engine including
   an engine main body where combustion is performed,
   an intake air passage and an exhaust passage connected to the engine main body, a turbocharger,
a throttle valve provided in the intake air passage,
a bypass passage connected to the exhaust passage, and
a waste gate valve provided in the bypass passage,
the turbocharger including
a compressor provided in the intake air passage, and
a turbine provided in the exhaust passage, the compressor and the turbine being rotated together,
the bypass passage allowing exhaust to flow as bypassing the turbine,
each of the engine and the first motor generator being mechanically coupled to the drive wheel with a planetary gear being interposed,
the planetary gear and the second motor generator being configured such that motive power output from the planetary gear and motive power output from the second motor generator are transmitted to the drive wheel as being combined, wherein
when a first condition is satisfied during traveling of the hybrid vehicle, the controller stops the combustion in the engine and performs motoring by the first motor generator such that the planetary gear outputs deceleration torque, and
when a second condition in addition to the first condition is satisfied during deceleration of the hybrid vehicle with the deceleration torque, the controller performs the motoring with opening of the throttle valve being set to first opening or larger and opening of the waste gate valve being set to second opening or smaller.

2. The hybrid vehicle according to claim 1, wherein
the second condition includes a condition that a rotation speed of the engine is equal to or higher than a first speed.

3. The hybrid vehicle according to claim 2, further comprising an accelerator sensor that detects an acceleration request from a driver, wherein
the first condition includes a condition that the rotation speed of the engine is equal to or higher than a second speed and a condition that the acceleration request from the driver is changed from ON to OFF, and
the second speed is lower than the first speed.

4. The hybrid vehicle according to claim 2, further comprising a brake sensor that detects a braking request from a driver, wherein
the first condition includes a condition that the rotation speed of the engine is equal to or higher than a third speed and a condition that the braking request from the driver is changed from OFF to ON, and
the third speed is lower than the first speed.

5. The hybrid vehicle according to claim 1, further comprising a power storage that receives electric power generated by regenerative braking applied by the second motor generator, wherein
the second condition includes a condition that an SOC of the power storage is equal to or higher than a prescribed SOC value.

6. The hybrid vehicle according to claim 1, wherein
a fully opened state is defined as the first opening and a fully closed state is defined as the second opening.

7. The hybrid vehicle according to claim 1, wherein
when the first condition is satisfied and the second condition is not satisfied during traveling of the hybrid vehicle, the controller
stops the combustion in the engine, and
performs the motoring by the first motor generator while the controller controls the throttle valve and the waste gate valve to maintain the engine main body in a combustion resumable state.

8. The hybrid vehicle according to claim 1, further comprising an electronically controllable brake apparatus that applies braking force to the drive wheel, wherein
when the first condition is satisfied and the second condition is not satisfied during traveling of the hybrid vehicle, the controller makes braking force applied by the brake apparatus larger than when the second condition is satisfied.

9. A method of braking a hybrid vehicle, the hybrid vehicle including a drive wheel, an engine, a first motor generator, and a second motor generator mechanically coupled to the drive wheel, and a controller that controls the engine, the first motor generator, and the second motor generator; the engine including an engine main body where combustion is performed, an intake air passage and an exhaust passage connected to the engine main body, a turbocharger, a throttle valve provided in the intake air passage, a bypass passage connected to the exhaust passage, and a waste gate valve provided in the bypass passage; the turbocharger including a compressor provided in the intake air passage and a turbine provided in the exhaust passage, the compressor and the turbine being rotated together, the bypass passage allowing exhaust to flow as bypassing the turbine; each of the engine and the first motor generator being mechanically coupled to the drive wheel with a planetary gear being interposed, the planetary gear and the second motor generator being configured such that motive power output from the planetary gear and motive power output from the second motor generator are transmitted to the drive wheel as being combined; the method comprising:
by the controller,
determining whether a first condition is satisfied during traveling of the hybrid vehicle;
when the first condition is satisfied, stopping the combustion in the engine and performing motoring by the first motor generator such that the planetary gear outputs deceleration torque;
determining whether a second condition is satisfied at least one of (1) when the motoring is started and (2) while the motoring is being performed; and
when the second condition is satisfied, setting opening of the throttle valve to first opening or larger and setting opening of the waste gate valve to second opening or smaller.

* * * * *